US012574119B2

(12) United States Patent     (10) Patent No.: US 12,574,119 B2

Tateno et al.     (45) Date of Patent: Mar. 10, 2026

(54) OPTICAL NETWORK SYSTEM, CONTROL METHOD, AND CONTROL DEVICE

(71) Applicant: NEC Corporation, Tokyo (JP)

(72) Inventors: Shoma Tateno, Tokyo (JP); Hidemi Noguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 278 days.

(21) Appl. No.: 18/533,398

(22) Filed: Dec. 8, 2023

(65) Prior Publication Data

US 2024/0214073 A1    Jun. 27, 2024

(30) Foreign Application Priority Data

Dec. 21, 2022    (JP) ................................. 2022-204160

(51) Int. Cl.
*H04B 10/29*     (2013.01)
*H04B 10/2513*     (2013.01)

(52) U.S. Cl.
CPC ................................... *H04B 10/29* (2013.01)

(58) Field of Classification Search
CPC . H04B 10/29; H04B 10/2513; H04B 10/2531
See application file for complete search history.

(56) References Cited

U.S. PATENT DOCUMENTS

| | | | | |
|---|---|---|---|---|
| 2002/0196507 | A1* | 12/2002 | Stuart | H04B 10/2513 398/178 |
| 2009/0016737 | A1* | 1/2009 | McVey | H04B 10/29 398/147 |
| 2012/0224855 | A1 | 9/2012 | Liu et al. | |
| 2014/0003815 | A1* | 1/2014 | Mertz | H04B 10/61 398/202 |

FOREIGN PATENT DOCUMENTS

| | | |
|---|---|---|
| JP | 2011-035735 A | 2/2011 |
| JP | 2017-511036 A | 4/2017 |

* cited by examiner

*Primary Examiner* — Shi K Li
(74) *Attorney, Agent, or Firm* — Sughrue Mion, PLLC

(57) ABSTRACT

An optical network system includes an optical repeater and a control device controlling the optical repeater. The control device: manages wavelength information of optical signals transmitted and received by the optical repeater in a path of the optical network and transmission line information of optical transmission lines connected to the optical repeater; determines a chromatic dispersion compensation amount for compensation in the optical repeater based on the wavelength information and the transmission line information; and determines phase conjugation processing in the optical repeater based on the wavelength information and the transmission line information. The optical repeater: acquires the chromatic dispersion compensation amount and phase conjugation processing information from the control device; performs chromatic dispersion compensation processing on an electrical signal based on the chromatic dispersion compensation amount; and performs phase conjugation processing on an electrical signal based on the phase conjugation processing information.

20 Claims, 18 Drawing Sheets

Figure 9:
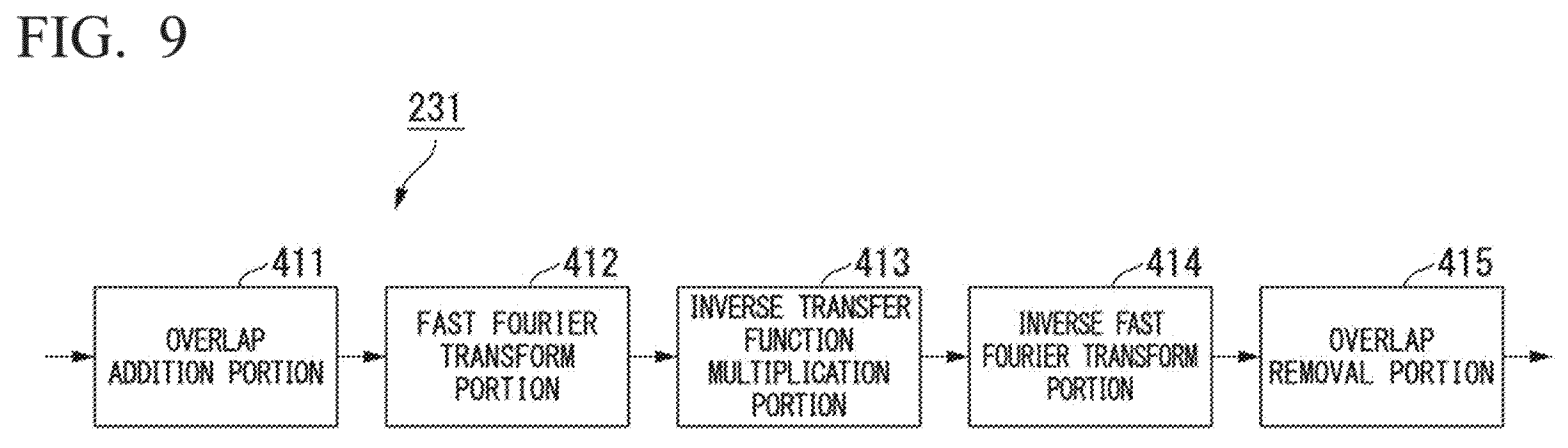

| 411 | 412 | 413 | 414 | 415 |
| OVERLAP ADDITION PORTION | FAST FOURIER TRANSFORM PORTION | INVERSE TRANSFER FUNCTION MULTIPLICATION PORTION | INVERSE FAST FOURIER TRANSFORM PORTION | OVERLAP REMOVAL PORTION |

FIG. 10

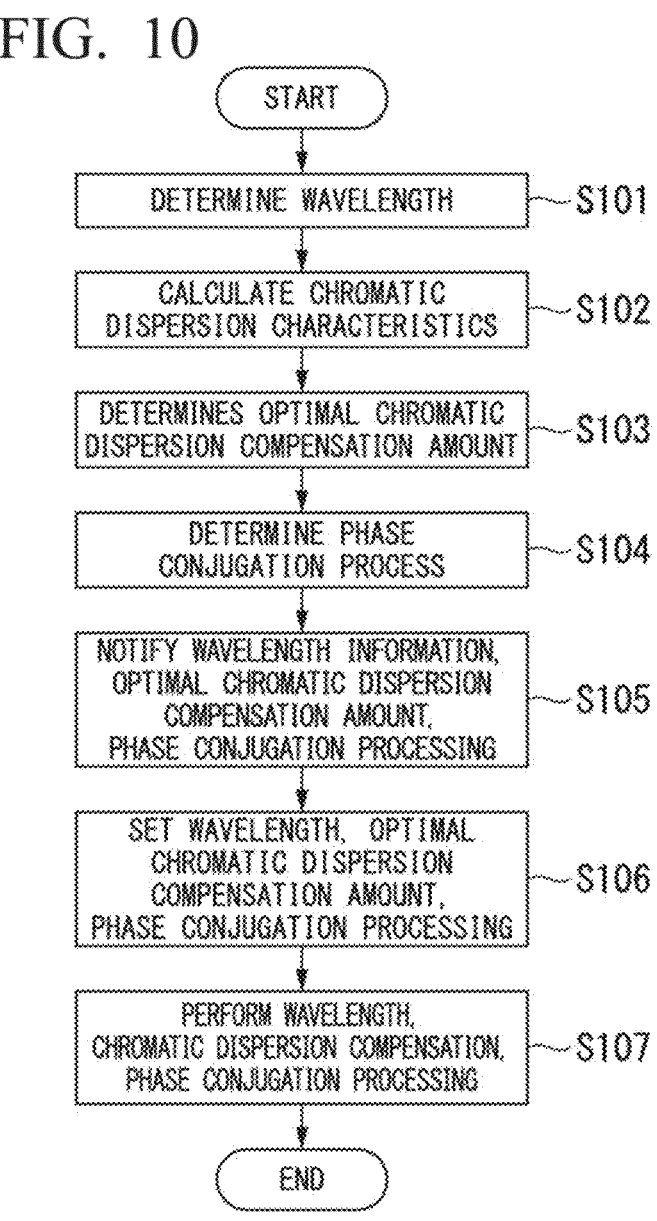

START

DETERMINE WAVELENGTH — S101

CALCULATE CHROMATIC DISPERSION CHARACTERISTICS — S102

DETERMINES OPTIMAL CHROMATIC DISPERSION COMPENSATION AMOUNT — S103

DETERMINE PHASE CONJUGATION PROCESS — S104

NOTIFY WAVELENGTH INFORMATION, OPTIMAL CHROMATIC DISPERSION COMPENSATION AMOUNT, PHASE CONJUGATION PROCESSING — S105

SET WAVELENGTH, OPTIMAL CHROMATIC DISPERSION COMPENSATION AMOUNT, PHASE CONJUGATION PROCESSING — S106

PERFORM WAVELENGTH, CHROMATIC DISPERSION COMPENSATION, PHASE CONJUGATION PROCESSING — S107

END

FIG. 11A

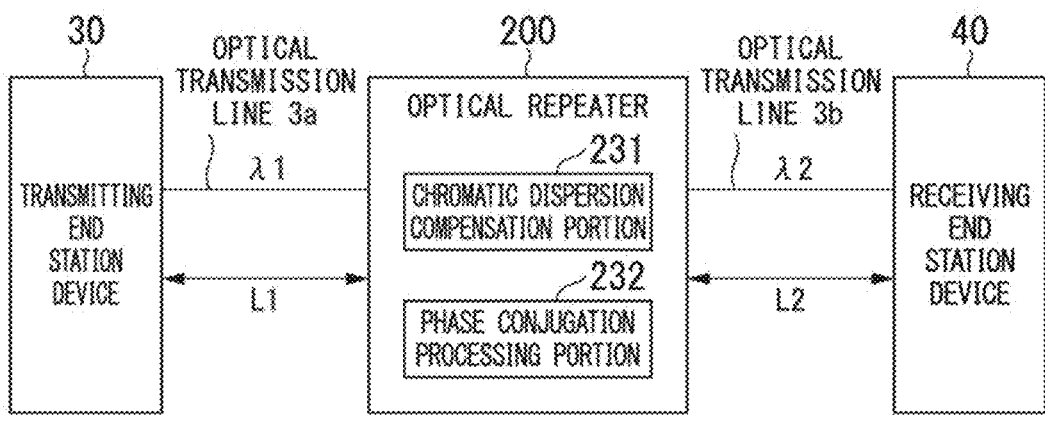

30    OPTICAL TRANSMISSION LINE 3a    200    OPTICAL TRANSMISSION LINE 3b    40

TRANSMITTING END STATION DEVICE

λ1

L1

OPTICAL REPEATER

231

CHROMATIC DISPERSION COMPENSATION PORTION

232

PHASE CONJUGATION PROCESSING PORTION

λ2

L2

RECEIVING END STATION DEVICE

FIG. 20

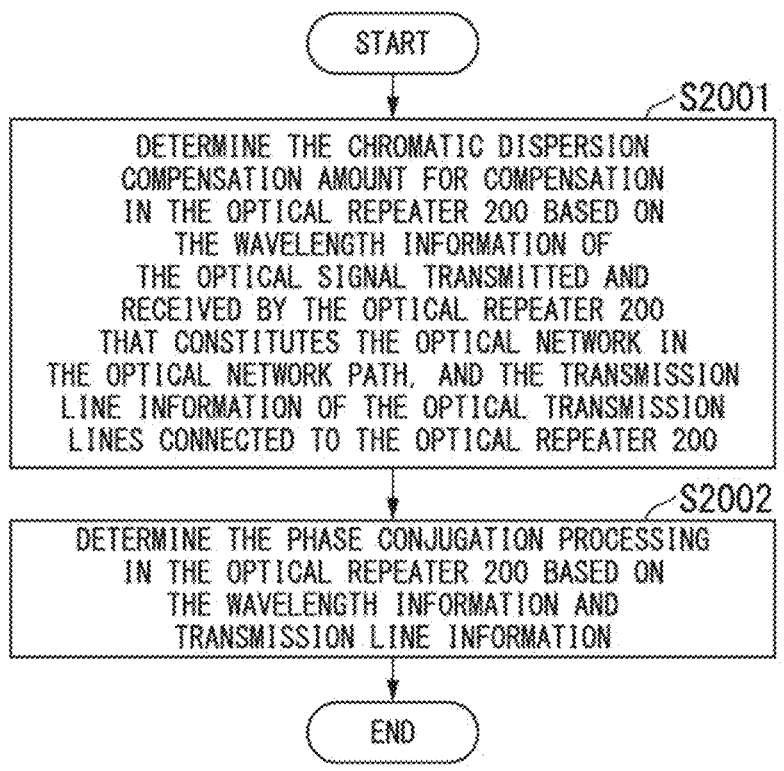

START

S2001

DETERMINE THE CHROMATIC DISPERSION
COMPENSATION AMOUNT FOR COMPENSATION
IN THE OPTICAL REPEATER 200 BASED ON
THE WAVELENGTH INFORMATION OF
THE OPTICAL SIGNAL TRANSMITTED AND
RECEIVED BY THE OPTICAL REPEATER 200
THAT CONSTITUTES THE OPTICAL NETWORK IN
THE OPTICAL NETWORK PATH, AND THE TRANSMISSION
LINE INFORMATION OF THE OPTICAL TRANSMISSION
LINES CONNECTED TO THE OPTICAL REPEATER 200

S2002

DETERMINE THE PHASE CONJUGATION PROCESSING
IN THE OPTICAL REPEATER 200 BASED ON
THE WAVELENGTH INFORMATION AND
TRANSMISSION LINE INFORMATION

END

FIG. 21

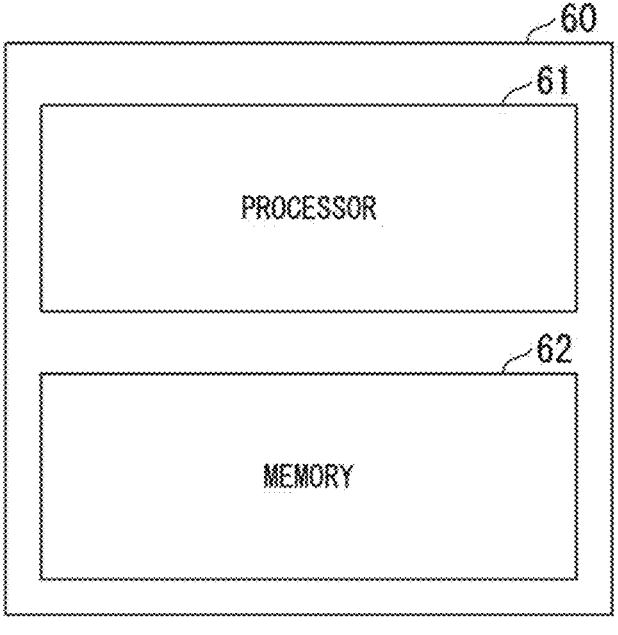

60

61

PROCESSOR

62

MEMORY

OPTICAL NETWORK SYSTEM, CONTROL METHOD, AND CONTROL DEVICE

This application is based upon and claims the benefit of priority from Japanese patent application No. 2022-204160, filed on Dec. 21, 2022, the disclosure of which is incorporated herein in its entirety by reference.

TECHNICAL FIELD

The present disclosure relates to an optical network system, a control method, and a control device.

BACKGROUND ART

In recent years, 5G wireless communication systems have been introduced, and in the post-5G era, there is a growing demand for high-capacity communication, ultra-high speed, ultra-low latency, and many simultaneous connections, not only in wireless communication but also in the field of optical communication. For this reason, research is being conducted on optical communication systems with the expectation that they will be used for various communication services and industrial applications.

For example, in backbone optical communication systems, digital coherent systems combining optical phase modulation and polarization multiplexing/separation technologies are used to achieve capacities in excess of 100 gigabits per second (Gbps). Moreover, research and development are also being conducted on transmission techniques that narrow the signal bandwidth and improve frequency utilization efficiency, enabling numerous simultaneous connections through Wavelength Division Multiplexing (WDM). Research and development are also being conducted on distortion compensation technology that uses optical processing or digital signal processing to compensate for signal distortion that occurs during optical transmission, which hinders high-capacity communications due to high baud rates and high multi-level signal modulation in optical communication systems.

Related technologies are known, for example, Patent Document 1 (Japanese Unexamined Patent Application Publication No. 2017-511036), Patent Document 2 (U.S. Patent Application Publication No. 2012/0224855), and Patent Document 3 (Japanese Unexamined Patent Application Publication No. 2011-035735). Patent Document 1 discloses a wavelength converter that converts the wavelength of an optical signal by means of a receiving end and a transmitting end using a coherent method.

Patent Document 2 discloses connecting an optical phase-conjugation device that generates phase-conjugated signals by digital signal processing between a transmitter and a receiver.

Patent Document 3 discloses connecting a dispersion compensation module that compensates chromatic dispersion in an optical transmission line between a transmitter and a receiver.

In technologies related to optical network systems as described above, it is required to suppress the degradation of signal quality caused by nonlinear distortion in optical transmission.

The purpose of the present disclosure is to provide an optical network system, a control method, a storage medium, a control device, and an optical repeater that solve the above-mentioned problems.

SUMMARY

An optical network system according to the present disclosure includes an optical repeater included in an optical network and a control device that controls the optical repeater, wherein the control device: manages wavelength information of optical signals transmitted and received by the optical repeater in a path of the optical network and transmission line information of optical transmission lines connected to the optical repeater; determines a chromatic dispersion compensation amount for compensation in the optical repeater based on the wavelength information and the transmission line information; and determines phase conjugation processing in the optical repeater based on the wavelength information and the transmission line information, and the optical repeater: acquires the determined chromatic dispersion compensation amount from the control device; acquires the determined phase conjugation processing information from the control device; performs phase conjugation processing on an electrical signal according to a received optical signal based on the acquired phase conjugation processing information; and performs chromatic dispersion compensation processing on an electrical signal according to a received optical signal based on the acquired chromatic dispersion compensation amount.

A control method according to the present disclosure manages wavelength information of optical signals transmitted and received by an optical repeater in a path of an optical network, transmission line information of optical transmission lines connected to the optical repeater, and the number of paths of the optical network, and determines a chromatic dispersion compensation amount for compensation and phase conjugation processing in the optical repeater based on the wavelength information, the transmission line information, and the number of paths in the optical network.

A control device according to the present disclosure determines a chromatic dispersion compensation amount for compensation in an optical repeater based on wavelength information of optical signals transmitted and received by the optical repeater in a path of an optical network, and transmission line information of optical transmission lines connected to the optical repeater, the optical repeater being included in the optical network, and determines phase conjugation processing in the optical repeater based on the wavelength information and the transmission line information.

According to the present disclosure, signal quality degradation due to nonlinear distortion in optical transmission can be suppressed.

BRIEF DESCRIPTION OF THE DRAWINGS

FIG. 9 is a configuration diagram that shows a configuration example of the chromatic dispersion compensation portion according to the first example embodiment.

FIG. 10 is a flowchart showing an example of the operation of an optical network system according to the first example embodiment.

FIG. 11A is a diagram showing a specific example of chromatic dispersion compensation by the control method of the first example embodiment.

FIG. 20 is a diagram that shows the processing flow by an optical repeater in another configuration of one example embodiment of the present disclosure.

FIG. 21 is a configuration diagram that shows an overview of the computer hardware of one example embodiment of the present disclosure.

EXAMPLE EMBODIMENT

Figure 1:
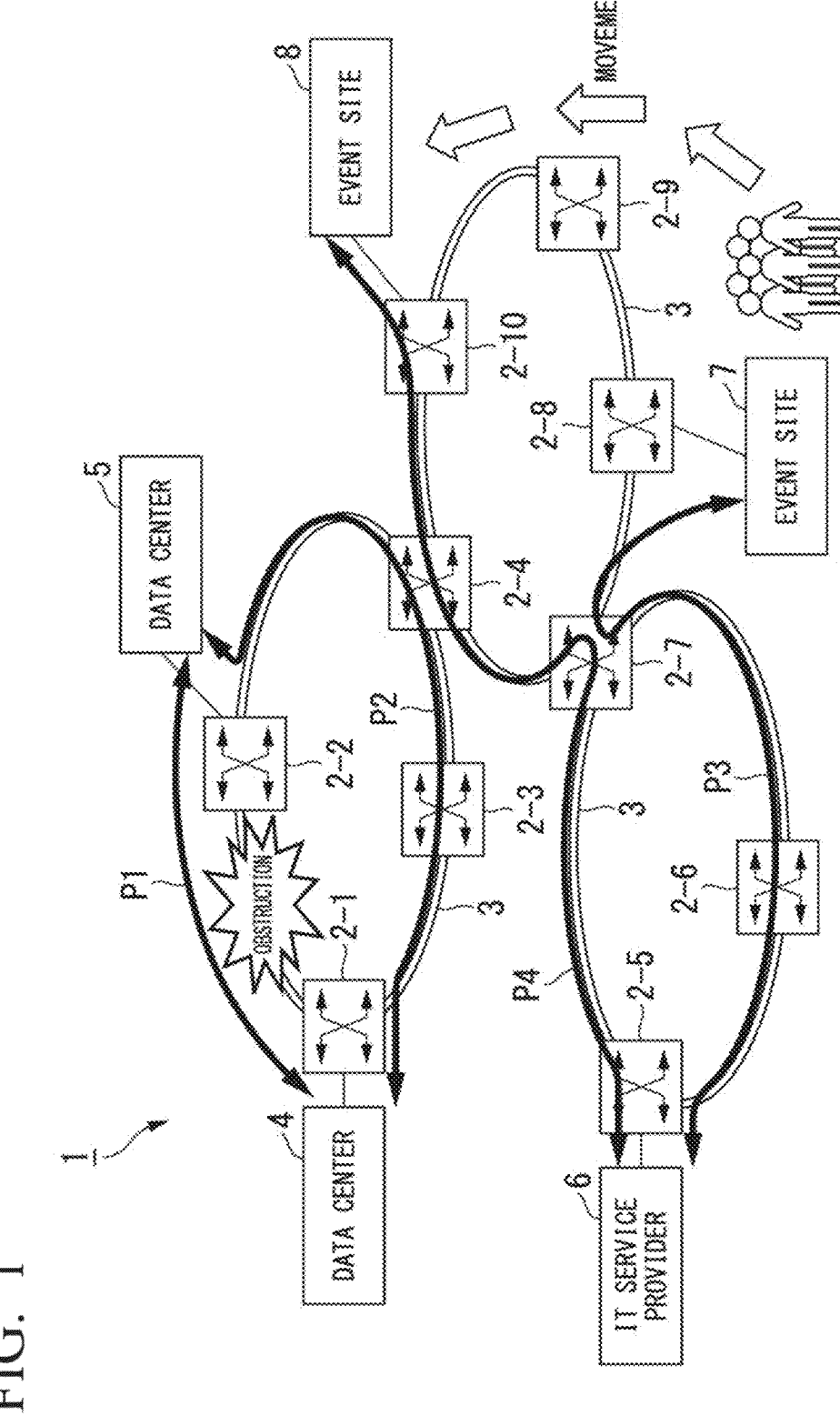
FIG. 1 is a configuration diagram of an optical network system according to a basic example.

The following description will refer to the drawings to describe example embodiments of the optical network system, control method, control program, control device, and optical repeater of the present disclosure. In each drawing, identical elements are denoted by the same reference numerals, and duplicate explanations are omitted where necessary.

Arrows added to the configuration diagrams (block diagrams) are for illustrative purposes only and do not limit the type or direction of signals.

(Considerations Leading to Implementation)

FIG. 1 shows the configuration of an optical network system based on a basic example serving as the basis of the present example embodiment. The optical network system 1 according to the basic example is, for example, a backbone wavelength-division multiplexing optical transmission system, and achieves high-capacity communication of over 100 Gbps by the devices comprising the system performing wavelength multiplexing of optical signals and performing high-level modulation and digital coherent transmission with optical signals at different wavelengths. High-density wavelength division multiplexing allows for improved frequency utilization efficiency of light and can accommodate mobile traffic and wavelength defragmentation.

The optical network system 1 includes optical repeaters 2 (e.g., 2-1 to 2-10) that can flexibly switch transmission paths (wavelength paths or optical transmission lines) while maintaining optical signals in order to accommodate switching of transmission paths in case of failure or to meet local traffic demand (e.g., traffic demand for communications from data centers 4 and 5, the network of an IT service provider 6, and networks of event sites 7 and 8). The optical network system 1 can maintain communication using optical signals as infrastructure by providing the optical repeaters 2 (e.g., 2-1 to 2-10). The optical repeater 2 is a photonic node that can relay wavelength-multiplexed optical signals and is, for example, a Reconfigurable Optical Add/Drop Multiplexer (ROADM). Each optical repeater 2 is assigned a wavelength path (also referred to simply as a path), and transfers traffic from the local network and other optical repeaters 2 accommodated via optical communication cables that pass optical signals of the assigned wavelength path to destination networks or other communication devices.

Figure 2:
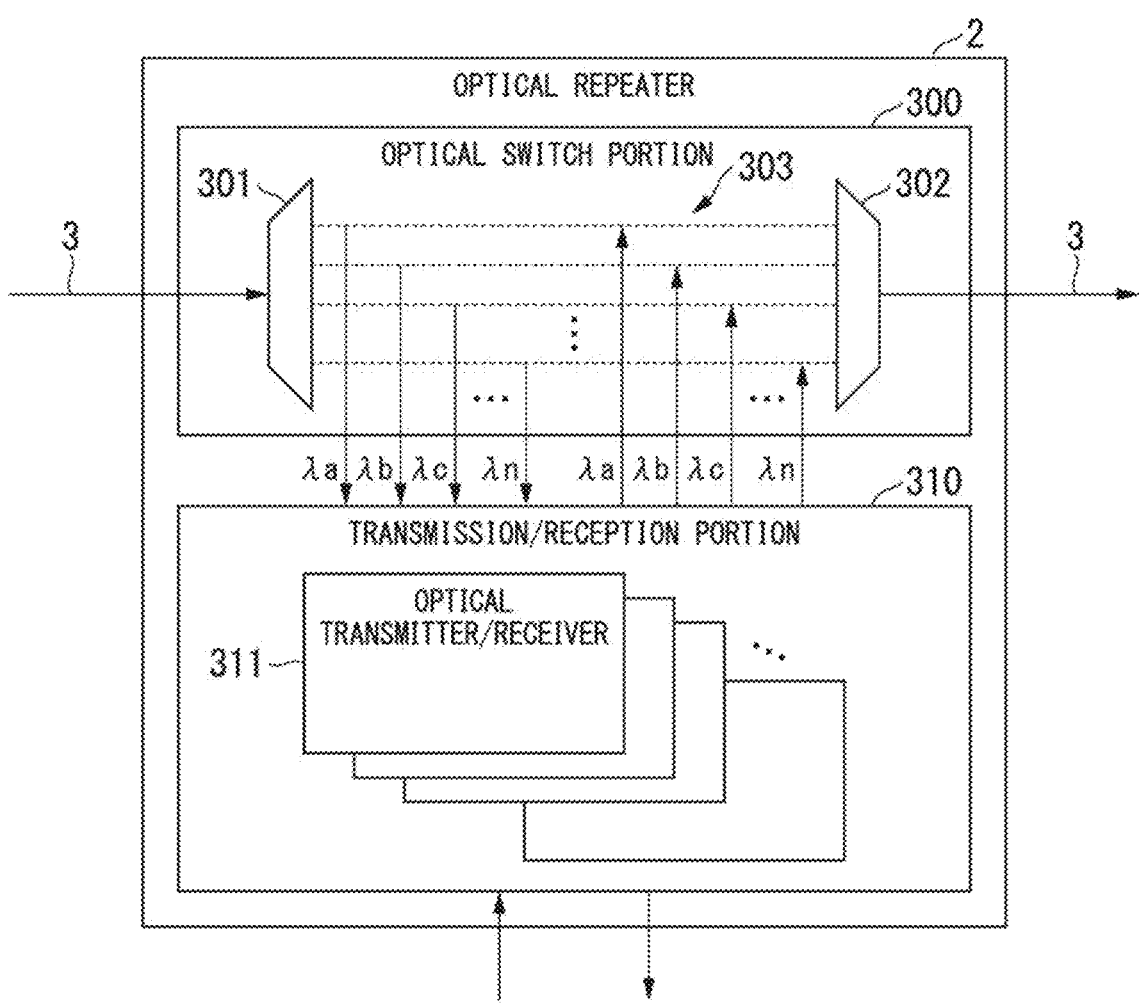
FIG. 2 is a configuration diagram of an optical repeater according to a basic example.

FIG. 2 shows a configuration example of the optical repeater 2 according to a basic example. The optical repeater 2 branches/inserts optical wavelength multiplex signals and coherently modulates and demodulates the signals of each wavelength subject to branching/insertion. As shown in FIG. 2, the optical repeater 2 includes an optical switch portion 300 and a transmission/reception portion 310.

The optical switch portion 300 forwards optical signals of a given wavelength path received from the front-stage optical repeater 2 in the optical network system 1 to the rear-stage optical repeater 2, and also branches/inserts the received optical signals by wavelength. For example, the optical switch portion 300 includes a demultiplexer 301, a multiplexer 302, and a branching/inserting portion 303. The demultiplexer 301 separates optical signals received from the optical transmission line 3 into optical signals of multiple wavelengths. The multiplexer 302 combines the optical signals of multiple wavelengths into a single optical signal and transmits it to the optical transmission line 3. The branching/inserting portion 303 branches/inserts optical signals of each wavelength between the demultiplexer 301 and the multiplexer 302.

The transmission/reception portion (transponder) 310 receives optical signals of each wavelength branched off from the branching/inserting portion 303 of the optical switch portion 300 and outputs coherently demodulated received data to the local device (network) that accommodates it. The transmission/reception portion 310 inputs transmission data from the local device and transmits (inserts) coherently modulated optical signals of each wavelength to the branching/inserting portion 303 of the optical switch portion 300. The transmission/reception portion 310 includes a plurality of optical transmitters/receivers 311 that transmit and receive optical signals at various wavelengths. Each optical transmitter/receiver 311 receives optical signals at a predetermined wavelength and further transmits optical signals at a predetermined wavelength (the same or different wavelength from the received wavelength) to the destination.

Figure 3:
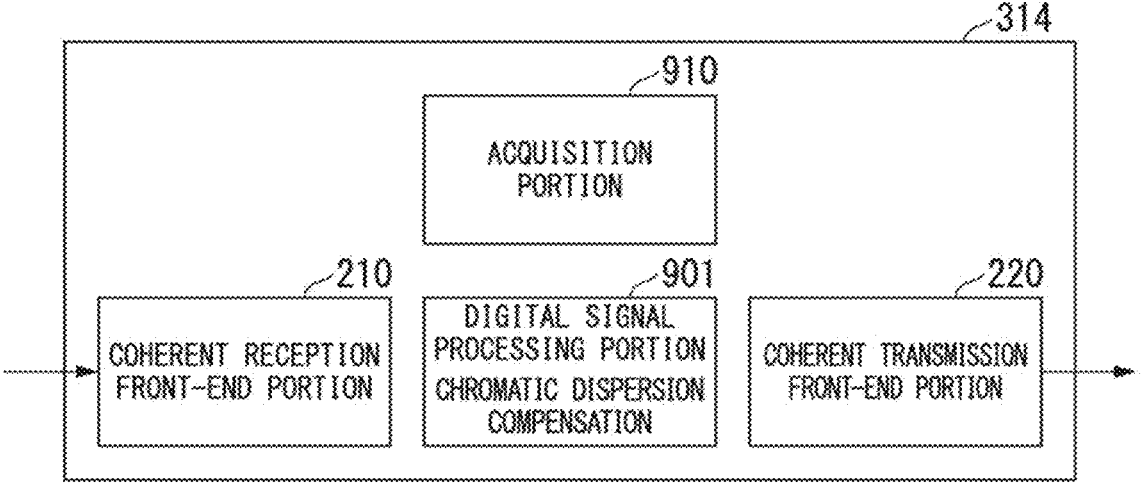
FIG. 3 is a configuration diagram of the optical transmitter/receiver according to the example under consideration.

The issues that arise when using an optical transmitter/receiver as the optical transmitter/receiver 311 are discussed here. FIG. 3 shows an example configuration of an optical transmitter/receiver for the example under consideration. As shown in FIG. 3, an optical transmitter/receiver 314 for the example under consideration includes a coherent reception front-end portion 210, a coherent transmission front-end portion 220, an acquisition portion 910, and a digital signal processing portion 901. The digital signal processing portion 901 enables chromatic dispersion compensation.

The coherent reception front-end portion 210 coherently detects the optical signal received from the front-stage optical repeater 2 using a local oscillator light of a predetermined wavelength and outputs the detected signal to the digital signal processing portion 901. The coherent transmission front-end portion 220 optically modulates the signal processed by the digital signal processing portion 901 to a predetermined wavelength (coherent modulation) and transmits the generated optical signal to the next-stage optical repeater 2. The digital signal processing portion 901 is a Digital Signal Processor (DSP) that converts the signal detected coherently by the coherent reception front-end portion 210 into a digital signal, outputs the processed received data, regenerates the input transmission data, and outputs the converted signal for optical modulation to the coherent transmission front-end portion 220. In the example under consideration, chromatic dispersion compensation is performed in the digital signal processing portion 901.

Figures 4A, 4B:
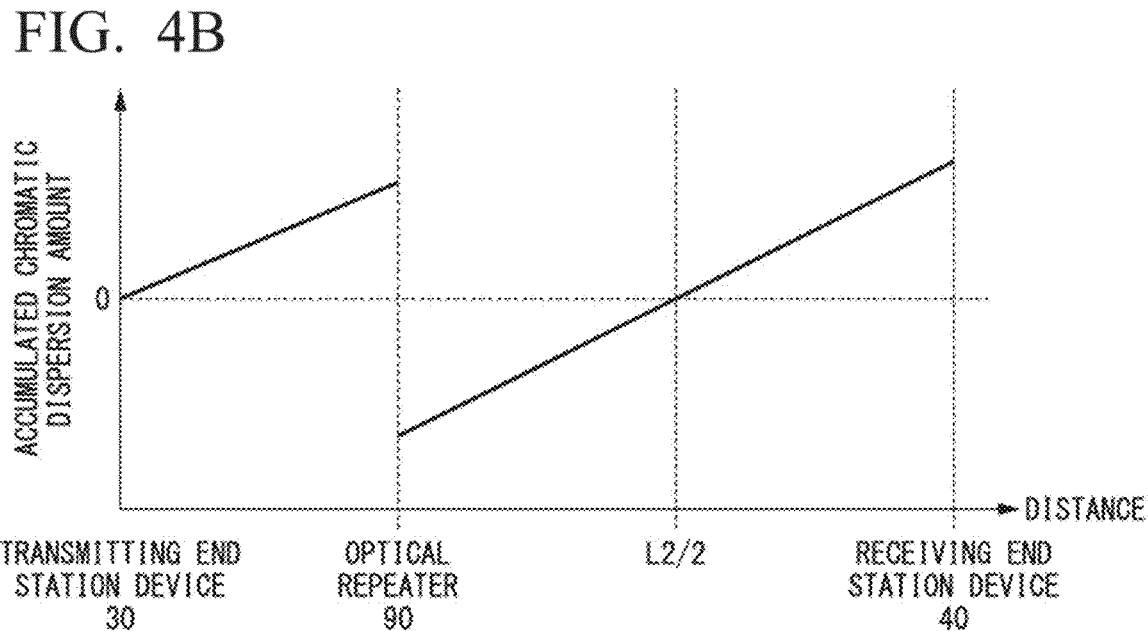
FIG. 4A is a diagram that illustrates the challenges of the optical transmitter/receiver according to the example under consideration.
FIG. 4B is a diagram that illustrates the challenges of the optical transmitter/receiver according to the example under consideration.

FIG. 4A and FIG. 4B show the chromatic dispersion amount in the case of an optical repeater 90 including the optical transmitter/receiver 314 according to the example under consideration. As shown in FIG. 4A, the optical repeater 90 is connected between the transmitting end station device (transmitting end) 30 and the receiving end station device (receiving end) 40 via optical transmission lines 3a and 3b. The optical transmission line 3a has distance L1 while the optical transmission line 3b has distance L2, and L1 and L2 may be the same length or different. Optical signals of wavelength λ1 are transmitted in the optical transmission line 3a, and optical signals of wavelength 12 are transmitted in the optical transmission line 3b.

In a configuration in which the optical repeater 90 is connected to the path from the transmitting end station device 30 to the receiving end station device 40 as shown in FIG. 4A, the transmitting end station device 30 side of the optical repeater 90 may be called the front stage of the optical repeater 90 (the receiving side of optical signals) and the receiving end station device 40 side of the optical repeater 90 may be called the rear stage of the optical repeater (the transmission side of optical signals). The optical transmission line between the optical repeater 90 and the transmitting end station device 30 may be referred to as the front-stage (first portion) optical transmission line, and the optical transmission line between the optical repeater 90 and the receiving end station device 40 as the rear-stage (second portion) optical transmission line.

As shown in FIG. 4B, the chromatic dispersion amount increases in proportion to the distance of the optical transmission line. Therefore, if the optical repeater relays optical signals only by mere signal amplification, the chromatic dispersion amount continues to increase with distance from the transmitting end station device 30 to the receiving end station device 40. Then, as the distance of the optical transmission line increases, the quality of the optical signal received at the receiving end station device 40 deteriorates significantly.

In the example considered, chromatic dispersion compensation is performed at the optical repeater 90 connected to the path from the transmitting end station device 30 to the receiving end station device 40. In the example considered, as shown in FIG. 4B, chromatic dispersion compensation is performed at the optical repeater 90 so that the chromatic dispersion amount becomes zero at the midpoint of the rear-stage optical transmission line 3b of the optical repeater 90, whereby the absolute value of the accumulated chromatic dispersion amount of the rear-stage optical transmission line can be minimized, the spectral dispersion of the optical signal due to the chromatic dispersion can be suppressed, and the effect of nonlinear distortion due to Self Phase Modulation (SPM) at the receiving end, the receiving end station device 40, can be mitigated. Nonlinear distortion is a phenomenon in which the refractive index in a material changes in proportion to the optical signal intensity as the optical signal propagates in an optical fiber, causing the phase of the light itself to change, which is a factor limiting high capacity and long-distance transmission due to high baud rates and multiple values.

Here, the above example consideration mitigates the effect of SPM-derived nonlinear distortion after single-span transmission in an optical transmission line, although it is a multi-span transmission optical network system. The span indicates the network interval formed by the optical transmission line 3 between network devices such as the transmitting end station device, the optical repeater 90, and the receiving end station device 40 that are included in the optical network system.

However, in the example considered, the mitigation effect of nonlinear distortion by chromatic dispersion compensation in multi-span optical transmission is not sufficient in a multi-span optical transmission network when the number of spans increases a lot. In the present disclosure, the optimal chromatic dispersion compensation and phase conjugation in optical repeaters in a multi-span optical transmission network make it possible to maximize the cancellation effect of nonlinear distortion caused by multi-span transmission light.

(Outline of Example Embodiment)

Figure 5:
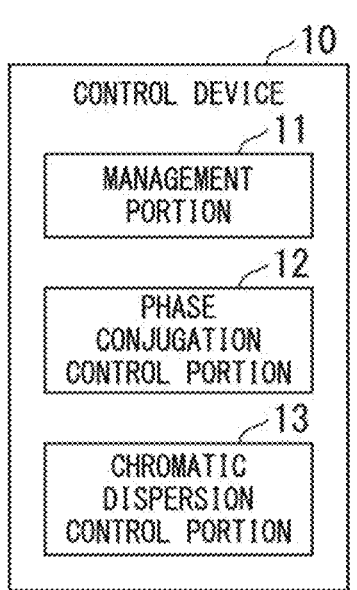
FIG. 5 is a configuration diagram that shows the outline configuration of the control device according to the example embodiment.
Figure 6:
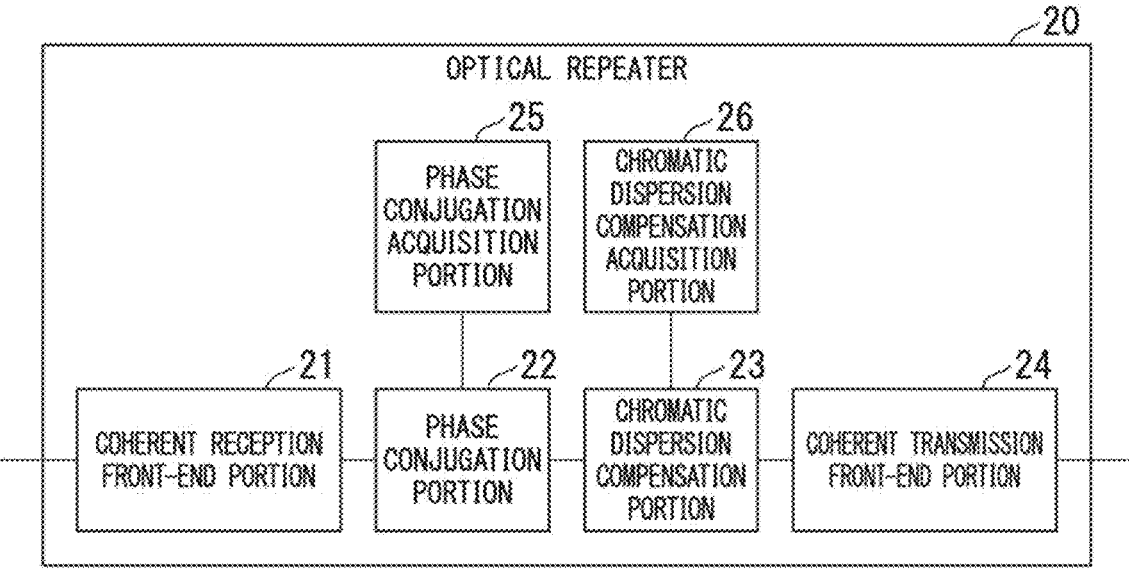
FIG. 6 is a configuration diagram that shows the outline configuration of the relay device according to the example embodiment.

FIG. 5 shows an outline configuration of the control system according to the present example embodiment. FIG. 6 shows the outline configuration of the optical relay system according to the present example embodiment. A control device 10 and an optical repeater 20 are included in an optical network system. The optical repeater 20 according to the present example embodiment is included in a part of the optical network system, and the control device 10 according to the present example embodiment controls the optical repeater 20, which is another component of the optical network system.

As shown in FIG. 5, the control device 10 has a management portion 11, a phase conjugation control portion 12, and a chromatic dispersion compensation control portion 13. The management portion 11 manages wavelength information of optical signals transmitted and received by the optical repeater 20 in a path of the optical network and transmission line information of optical transmission lines connected to the optical repeater 20. The phase conjugation control portion 12 determines the phase conjugation process in the optical repeater 20 based on the wavelength information and transmission line information managed by the management portion 11. The chromatic dispersion compensation control portion 13 determines the chromatic dispersion compensation amount for compensation in the optical repeater 20 based on the wavelength information and transmission line information managed by the management portion 11.

As shown in FIG. 6, the optical repeater 20 includes a coherent reception front-end portion 21, a phase conjugation portion 22, a chromatic dispersion compensation portion 23, a coherent transmission front-end portion 24, a phase conjugation acquisition portion 25, and a chromatic dispersion compensation acquisition portion 26.

The phase conjugation acquisition portion 25 acquires the phase conjugation process determined by the phase conjugation control portion 12 from the control device 10. The chromatic dispersion compensation acquisition portion 26 acquires the chromatic dispersion compensation amount determined by the chromatic dispersion compensation control portion 13 from the control device 10. The coherent reception front-end portion 21 detects the received optical signal coherently based on the local oscillator light and outputs a coherently detected electrical signal. The phase conjugation portion 22 performs phase conjugation processing by digital signal processing on the electrical signal output from the coherent reception front-end portion 21 based on phase conjugation processing settings acquired by the phase conjugation acquisition portion 25. The chromatic dispersion compensation portion 23 performs chromatic dispersion compensation processing by digital signal processing on the electrical signal output from the phase conjugation portion 22 based on a chromatic dispersion compensation amount acquired by the chromatic dispersion compensation acquisition portion 26. The coherent transmission front-end portion 24 coherently modulates the electrical signal subject to phase conjugation processing by the phase conjugation portion 22 and the electrical signal subject to chromatic dispersion compensation processing by the chromatic dispersion compensation portion 23 based on the transmission light, and transmits the coherently modulated optical signal.

Thus, in the example embodiment, the control device 10 determines the phase conjugation processing and the chromatic dispersion compensation amount in the optical repeater 20 based on the wavelength information of the optical signal transmitted and received by the optical repeater 20 in the path and the transmission line information of the optical transmission line connected to the optical repeater 20. The control device 10 performs the determined phase conjugation processing and chromatic dispersion compensation of the chromatic dispersion compensation amount in the optical repeater 20.

Phase conjugation of optical signals at the optical repeater 20 allows the distortion of optical signals to be inverted in the front-stage optical transmission line of the optical repeater 20. As the signal propagates through the rear-stage optical transmission line of the optical repeater 20, the distortion is reproduced in reverse and so the distortion is canceled at the receiving end. In the example embodiments described below, since chromatic dispersion compensation can be performed with appropriate phase conjugation and chromatic dispersion compensation amount in the optical repeater 20, by using phase conjugation and chromatic dispersion compensation at each optical relay unit 20 in a multi-span optical network, it is possible to maximize the cancellation effect of nonlinear distortion caused by multi-span optical transmission, and so it is possible to effectively reduce signal quality degradation due to nonlinear distortion at the receiving end of the optical network.

First Example Embodiment

Figure 7:
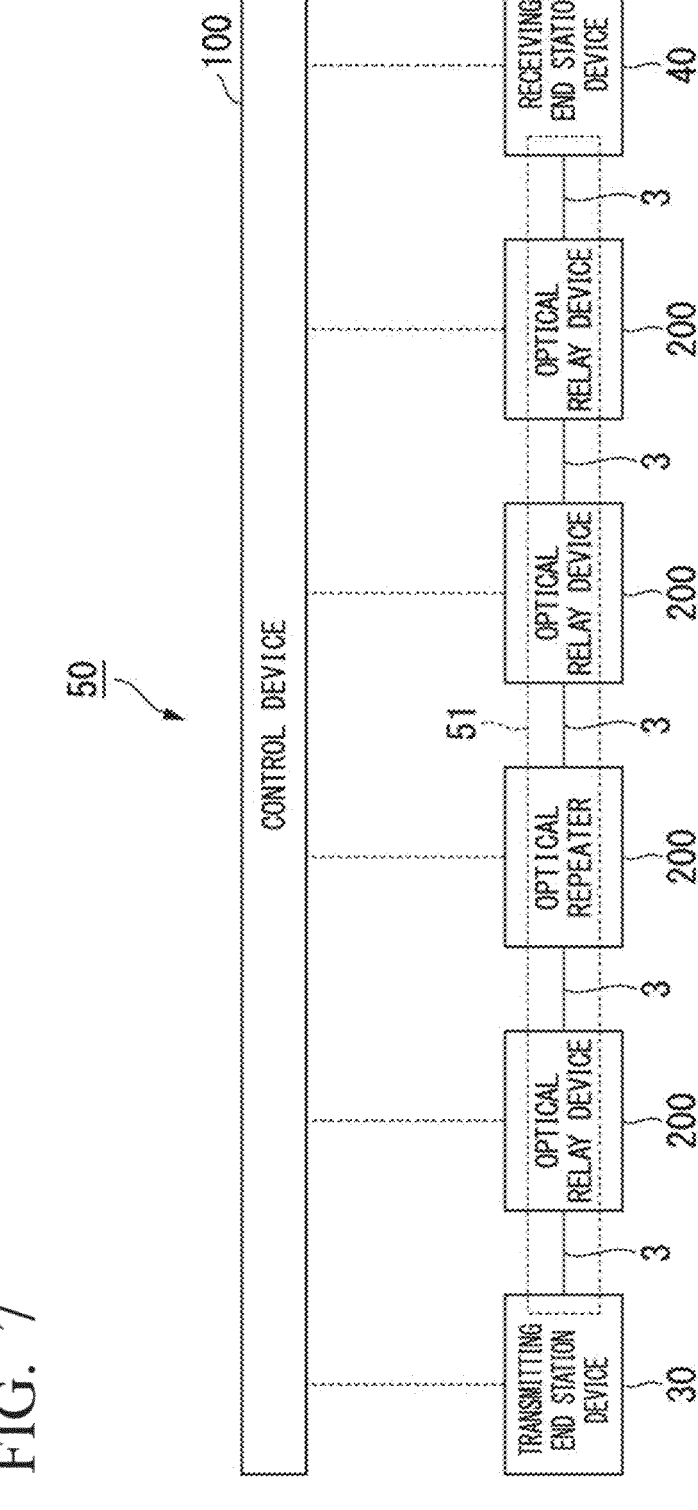
FIG. 7 is a configuration diagram that shows a configuration example of the optical network system according to the first example embodiment.

Next, the first example embodiment shall be explained with reference to the drawings. FIG. 7 shows an example of the configuration of the optical network system according to the present example embodiment. As shown in FIG. 7, an optical network system 50 includes a control device 100, a plurality of optical repeaters 200, a transmitting end station device 30, and a receiving end station device 40.

The plurality of optical repeaters 200, the transmitting end station device 30, and the receiving end station device 40 are connected to each other via optical transmission lines 3 to enable optical communication. The plurality of optical repeaters 200, the transmitting end station device 30, the receiving end station device 40, and the control device 100 are connected to enable communication of control signals. The plurality of optical repeaters 200, the transmitting end station device 30, the receiving end station device 40, and the control device 100 may be connected via optical transmission lines 3 or may be communicatively connected by any other transmission path, including wired or wireless.

The plurality of optical repeaters 200, the transmitting end station device 30, and the receiving end station device 40 are optical transmission devices (optical nodes) that perform optical communication via the optical transmission lines 3. The transmitting end station device 30 and the receiving end station device 40 are included in the transmitting end and the receiving end in a path configured by connecting the multiple optical transmission lines 3. The transmitting end station device 30 transmits optical signals wavelength-multiplexed by the wavelength of the path set by the control device 100 to the receiving end station device 40 via the optical transmission lines 3. The receiving end station device 40 receives the optical signals wavelength-multiplexed by the wavelength of the path set by the control device 100 from the transmitting end station device 30 via the optical transmission lines 3.

The plurality of optical repeaters 200 are relay devices that can relay wavelength-multiplexed optical signals, as in the basic example. The plurality of optical repeaters 200 is included in an optical network 51 that performs WDM communication. The plurality of optical repeaters 200, together with the transmitting end station device 30 and the receiving end station device 40, can be said to be included in the optical network 51. The optical network 51 is a wavelength-division multiplexed optical network, as in FIG. 1. The optical network 51 can be a mesh-shaped network, a ring-shaped network, a point-to-point network, or other topology. The plurality of optical repeaters 200 configure a path from the transmitting end station device 30 to the receiving end station device 40 in response to control from the control device 100, and transmit optical signals (data) according to wavelengths set on each path.

The control device 100 manages and controls the optical network 51 including the plurality of optical repeaters 200. For example, the control device 100 is a Network Management System (NMS) that manages the network.

The control device 100 manages and controls the paths configured by the optical repeaters 200 in the optical network 51. The control device 100 manages the path routes and wavelengths from the transmitting end station device 30 to the receiving end station device 40, and sets the path routes, wavelengths, etc. for the transmitting end station device 30 and receiving end station device 40 and the optical repeaters 200 on the path route.

Figure 8:
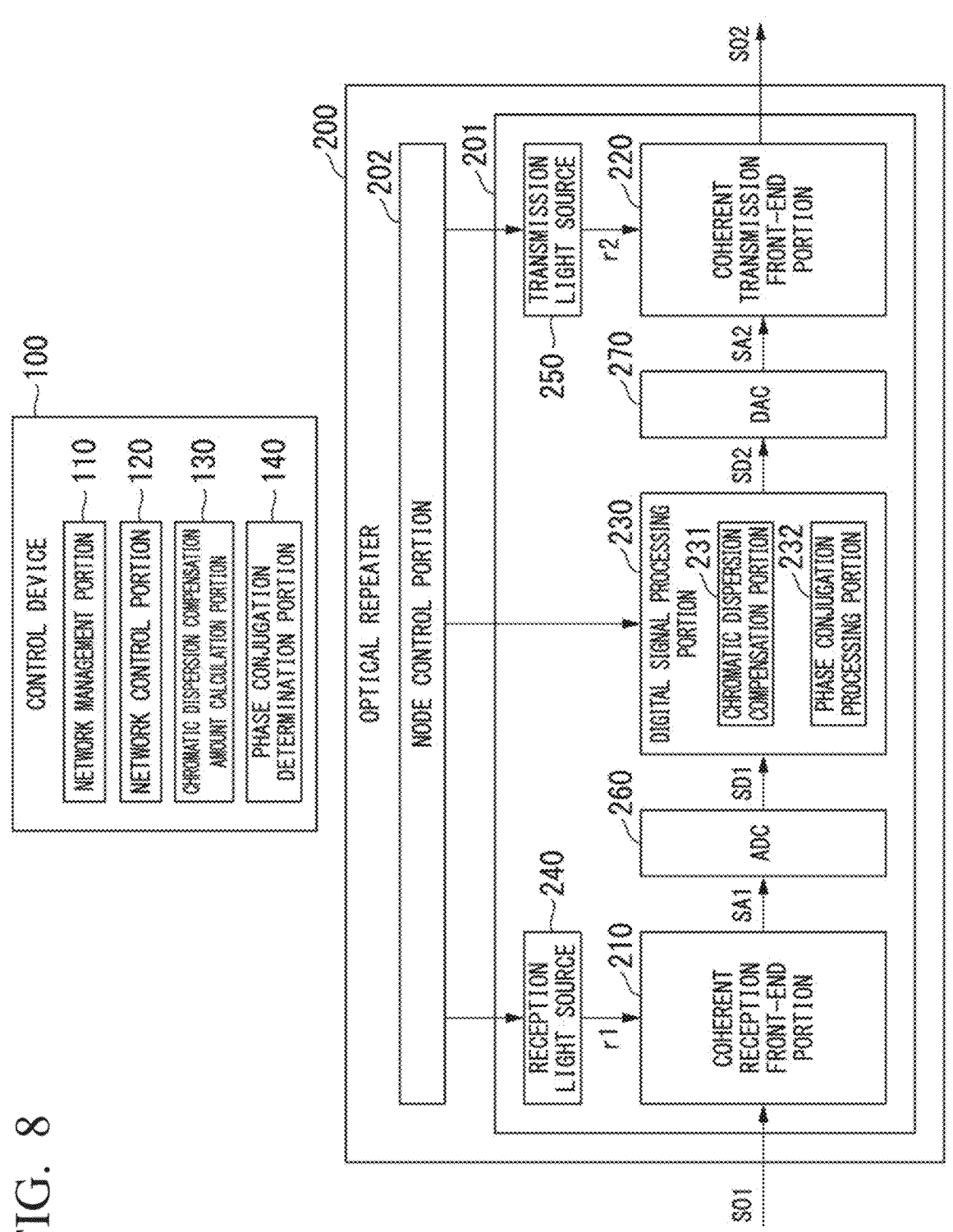
FIG. 8 is a configuration diagram that shows a configuration example of each device in the optical network system according to the first example embodiment.

FIG. 8 shows an example of the configuration of each device in this optical network system. As shown in FIG. 8, the control device 100 has a network management portion 110, a network control portion 120, a chromatic dispersion compensation amount calculation portion 130, and a phase conjugation determination portion 140.

The network management portion 110 manages information necessary for network management, such as network configuration information and path configuration information in the optical network 51. For example, the network management portion 110 may consist of a database that stores information necessary for network management. The network configuration information includes the connection relationship among the optical repeaters 200, the transmitting end station device 30, and the receiving end station device 40 included in the network, as well as transmission line information of the optical transmission lines 3 that connect each device. The transmission line information includes the distance L (transmission line length) of the optical transmission line and may include the structure and type of optical fiber, transmission characteristics, and the like. The path configuration information includes information on each device constituting the path, the wavelengths available to each device on the path route, and the usage status of the wavelengths. Such information may be set in a database in advance, or may be set by information collected from each device, and may also be updated by the network control portion 120 and the like.

The network control portion 120 controls the paths in the optical network 51 and the optical repeaters 200, the transmitting end station device 30, and the receiving end station device 40 included in the paths. The network control portion 120 determines the path route and wavelength from the transmitting end station device 30 to the receiving end station device 40 by referring to the network configuration information, path configuration information, etc. in the network management portion 110, and sets the determined route and wavelength to the transmitting end station device 30, receiving end station device 40, and optical repeaters 200 on the path. The wavelength of light in a path is determined for each optical transmission line in a path's route. For example, if a path's route overlaps another path's route, different wavelengths are selected between the paths from the available wavelengths in the optical transmission line in the overlapping section. The network control portion 120 outputs the information necessary to calculate the chromatic dispersion compensation amount in the optical repeaters 200 that are included in the path to the chromatic dispersion compensation amount calculation portion 130. For example, the network control portion 120 outputs reception wavelength information (wavelength information of received optical signals), transmission wavelength information (wavelength information of transmitted optical signals), and transmission line information of the preceding and following optical transmission lines for the optical repeaters 200. The network control portion 120 outputs the phase conjugation determination information in the optical repeater 200 that is included in the path to the phase conjugation determination portion 140. For example, the network control portion 120 outputs the number of paths and the number of optical repeaters in the optical network 51.

The chromatic dispersion compensation amount calculation portion 130 calculates the chromatic dispersion compensation amount for the optical repeaters 200 comprising the path to perform chromatic dispersion compensation. The chromatic dispersion compensation amount calculation portion 130 is a compensation control portion that determines and controls the chromatic dispersion compensation amount of each optical repeater 200. The chromatic dispersion compensation amount calculation portion 130 determines the optimal chromatic dispersion compensation amount for each optical repeater 200 based on the reception wavelength information, the transmission wavelength information, and the transmission line information before and after the optical repeater 200 obtained from the network control portion 120. The chromatic dispersion compensation amount calculation portion 130 notifies the optical repeater 200 in question of the reception wavelength information, the transmission wavelength information, and the optimal chromatic dispersion compensation amount.

The phase conjugation determination portion 140 controls the phase conjugation processing of each optical repeater 200 included in the path. The phase conjugation determination portion 140 determines the optimal phase conjugation processing for each optical repeater 200 based on the number of paths and the number of optical repeaters in the optical network 51 obtained from the network control portion 120. The phase conjugation determination portion 140 notifies the optical repeater 200 of the phase conjugation processing information.

As shown in FIG. 8, the optical repeater 200 includes an optical transmitter/receiver 201 and a node control portion 202. Although omitted in FIG. 8, as in the basic example in FIG. 2, the optical repeater 200 includes the optical switch portion 300 and the transmission/reception portion 310, and includes a plurality of the optical transmitters/receivers 201 in the transmission/reception portion 310. In other words, the node control portion 202 can control the optical switch portion 300 and the transmission/reception portion 310 (plurality of optical transmitters/receivers 201).

Each optical transmitter/receiver 201 includes the coherent reception front-end portion 210, the coherent transmission front-end portion 220, a digital signal processing portion 230, a reception light source 240, a transmission light source 250, an analog to digital converter (ADC) 260, and a digital to analog converter (DAC) 270.

The reception light source 240 generates local oscillator light r1 of the wavelength (frequency) set by the node control portion 202 and outputs the generated local oscillator light r1 to the coherent reception front-end portion 210. The transmission light source 250 generates transmission light r2 of the wavelength (frequency) set by the node control portion 202 and outputs the generated transmission light r2 to the coherent transmission front-end portion 220.

The frequency (wavelength) of the local oscillator light r1 is the frequency (carrier frequency) of the input optical signal SO1 to be received, and the frequency of the transmission light r2 is the frequency of the output optical signal SO2 to be transmitted. For example, the local oscillator light r1 and the transmission light r2 may be different frequencies or the same frequency. By changing the frequency of the local oscillator light r1 and the transmission light r2, the wavelength of the optical signal to be relayed can be switched. This allows the input optical signal SO1 to be converted to an output optical signal SO2 of a different wavelength.

The coherent reception front-end portion 210 and the coherent transmission front-end portion 220 have the same configuration as in FIG. 3. The coherent reception front-end portion 210 is an optical/electrical converting portion that converts optical signals to electrical signals and is a coherent detection portion that performs coherent detection. The coherent reception front-end portion 210 coherently detects the input optical signal SO1 (received optical signal) based on the local oscillator light r1 and outputs the generated analog signal SA1 (first analog electrical signal).

The ADC 260 digitizes the analog signal SA1 generated by the coherent reception front-end portion 210 and outputs the converted digital signal SD1 (first digital electrical signal).

The DAC 270 converts the digital signal SD2 (second digital electrical signal) processed by the digital signal processing portion 230 into an analog signal and outputs the converted analog signal SA2 (second analog electrical signal).

The coherent transmission front-end portion 220 is an electrical/optical converter that converts electrical signals to optical signals and a coherent modulator that performs coherent modulation. The coherent transmission front-end portion 220 coherently modulates the analog signal SA2, which is digitally converted by the DAC 270, based on the transmission light r2, and outputs the generated output optical signal SO2 (transmitted optical signal).

For example, the input optical signal SO1 and the output optical signal SO2 are phase modulated and polarization multiplexed optical signals. The analog signals SA1 and SA2 and digital signals SD1 and SD2 are four-lane (4-channel) signals that include the IX signal of the I component (in-phase component) of X polarization, the QX signal of the Q component (quadrature component) of X polarization, the IY signal of the I component of Y polarization, and the QY signal of the Q component of Y polarization.

The digital signal processing portion 230 performs digital signal processing on the digital signal SD1 converted by the ADC 260 and outputs the digital signal SD2 after the digital signal processing. The digital signal processing portion 230 is a digital circuit that performs the prescribed digital signal processing to compensate for signal quality. The digital signal processing portion 230 performs digital signal processing on all or some of the four-lane signals IX, QX, IY, and QY (either X or Y polarization), respectively.

The digital signal processing portion 230 performs specific signal processing without conducting processes that entail significant delays, such as code error correction (data regeneration). This allows the required signal quality to be compensated while minimizing signal delay. In the present example embodiment, the digital signal processing portion 230 includes a chromatic dispersion compensation portion 231 for chromatic dispersion processing and a phase conjugation processing portion 232 for phase conjugation processing.

The chromatic dispersion compensation by digital signal processing can be realized by convolution of the impulse response of the inverse transfer function of an optical transmission line with the received signal. Therefore, for example, the chromatic dispersion compensation portion 231 may be configured with a transversal filter (FIR filter). Since the characteristics of an optical transmission line can be modeled with an FIR filter, chromatic dispersion can be compensated by the FIR filter with its inverse characteristics. While the FIR filter performs time-domain equalization (TDE) in the time domain against received signals, the same characteristic may be achieved by frequency domain equalization (FDE) to equalize in the frequency domain. By configuring the chromatic dispersion compensation portion with an FDE, the circuit scale can be reduced compared to that of FIR filters.

FIG. 9 shows an example of a configuration when the chromatic dispersion compensation portion 231 is configured using FDE processing. The chromatic dispersion compensation portion 231 in FIG. 9 is an example of an overlap FDE configuration and includes an overlap addition portion 411, a fast Fourier transform portion 412, an inverse transfer function multiplication portion 413, an inverse fast Fourier transform portion 414, and an overlap removal portion 415.

The node control portion 202 sets the chromatic dispersion compensation amount notified by the control device 100 to the chromatic dispersion compensation portion 231 in the digital signal processing portion 230. When the chromatic dispersion compensation portion 231 is configured using FDE as shown in FIG. 9, the node control portion 202 sets the transfer function coefficient of the inverse transfer function multiplication portion 413 in FIG. 9 according to the chromatic dispersion compensation amount notified by the control device 100.

The overlap addition portion 411 overlaps a portion of the front and rear signals with respect to the input signal (digital signal). The fast Fourier transform portion 412 then converts the overlapped signal into the frequency-domain signal using fast Fourier transform (FFT). The inverse transfer function multiplication portion 413 equalizes the signal in the frequency domain by multiplying it by the inverse transfer function of the transmission line. The inverse fast Fourier transform portion 414 then performs the inverse fast Fourier transform (IFFT) to convert the signal into a time-domain signal. The overlap removal portion 415 removes overlapping portions from the restored signal in the time domain and outputs it. When using FDE, the chromatic dispersion compensation amount can be adjusted by changing the inverse transfer function. The overlap addition portion 411 and overlap removal portion 415 may be omitted.

Phase conjugation processing by digital signal processing finds the complex conjugate of the input digital signal. That is, the sign of the imaginary component Q in the Ix, Qx, Iy, and Qy signals is inverted as in the following Equation (1).

$$
\begin{aligned}
I_X &= \mathrm{Re}\big[(I_X - jQ_x)e^{j\Phi1}\big] \\
Q_X &= \mathrm{Im}\big[(I_X - jQ_x)e^{j\Phi1}\big] \\
I_Y &= \mathrm{Re}\big[(I_Y - jQ_Y)e^{j\Phi2}\big] \\
Q_Y &= \mathrm{Im}\big[(I_Y - jQ_Y)e^{j\Phi2}\big]
\end{aligned}
\tag{1}
$$

The node control portion 202 receives control information from the control device 100 and controls each part of the optical repeater 200 based on the received control information. The node control portion 202 is an acquisition portion that acquires reception wavelength information and transmission wavelength information from the network control portion 120, the optimal chromatic dispersion compensation amount from the chromatic dispersion compensation amount calculation portion 130, and phase conjugation processing information from the phase conjugation determination portion 140. The node control portion 202 sets the frequency (wavelength) of the local oscillator light r1 to the reception light source 240 based on the acquired reception wavelength information and sets the frequency of the transmission light r2 to the transmission light source 250 based on the acquired transmission wavelength information. The node control portion 202 sets the phase conjugation processing operation to the phase conjugation processing portion 232 based on control information including instructions to perform phase conjugation processing acquired from the control device 100. The node control portion 202 sets the chromatic dispersion compensation amount to the chromatic dispersion compensation portion 231 based on the optimal chromatic dispersion compensation amount that was acquired.

FIG. 10 shows an example of the operation of the optical network system according to the present example embodiment. As shown in FIG. 10, first, the network management portion 110 of the control device 100 determines the wavelength to be used by the optical repeater 200 (S101). The network control portion 120 of the control device 100 determines the path route in the optical network 51 and identifies the optical transmission line and the optical repeaters 200 on the path route. By determining the wavelength of each optical transmission line identified, the network control portion 120 determines the wavelengths of the front stage and rear stage (before and after conversion) in each optical repeater 200, i.e., the wavelengths of the optical signals transmitted and received by the optical repeater 200. The network control portion 120 outputs the reception wavelength information and transmission wavelength information of the optical repeater 200 based on the determined wavelengths to the chromatic dispersion compensation amount calculation portion 130 and the phase conjugation determination portion 140, and also outputs the transmission line information (distance) of the front-stage and rear-stage optical transmission line of the optical repeater 200 to the chromatic dispersion compensation amount calculation portion 130 and the phase conjugation determination portion 140. If the path includes multiple optical repeaters 200, the following process is performed for each optical repeater.

Next, the chromatic dispersion compensation amount calculation portion 130 of the optical repeater 200 calculates the chromatic dispersion characteristics in the front-stage and rear-stage optical transmission lines (S102). The chromatic dispersion compensation amount calculation portion 130 calculates chromatic dispersion characteristic in the front-stage and rear-stage optical transmission lines of each optical repeater 200, based on the reception wavelength information and transmission wavelength information acquired from the network control portion 120 and the transmission line information (distance) of the front-stage and rear-stage optical transmission line of the optical repeater 200. If the transmission information includes the structure, type, and transmission characteristics of the optical fiber, the chromatic dispersion characteristic may be determined based on this information.

For example, the chromatic dispersion characteristic is the slope of the accumulated chromatic dispersion amount with respect to the distance of the optical transmission line (chromatic dispersion characteristic as a function of distance). Since the slope of the chromatic dispersion amount varies with wavelength, a table relating the wavelength (or wavelength band) to the slope of the chromatic dispersion may be stored in advance. The chromatic dispersion compensation amount calculation portion 130 may refer to this table to determine the chromatic dispersion characteristic corresponding to the wavelength.

Next, the chromatic dispersion compensation amount calculation portion 130 of the control device 100 determines the optimal chromatic dispersion compensation amount in the optical repeater 200 (S103). The chromatic dispersion compensation amount calculation portion 130 determines the optimal chromatic dispersion compensation amount in the optical repeater 200 based on the chromatic dispersion characteristics of the front-stage and rear-stage optical transmission lines of the optical repeater 200 and the transmission line information of the front-stage and rear-stage optical transmission lines. The chromatic dispersion compensation amount calculation portion 130 calculates the chromatic dispersion amount accumulated in the optical transmission line in the front stage (reception side) and the chromatic dispersion amount accumulated in the optical transmission line in the rear stage (transmission side), and determines the optimum chromatic dispersion amount based on the front-stage and rear-stage chromatic dispersion amounts. In particular, the chromatic dispersion compensation amount calculation portion 130 determines the optimal chromatic dispersion amount based on the chromatic dispersion amount accumulated between the transmitting end station device 30 and the optical repeater 200 and the chromatic dispersion amount accumulated between the optical repeater 200 and the receiving end station device 40. For example, the chromatic dispersion compensation amount calculation portion 130 calculates the chromatic dispersion amount accumulated in the front-stage optical transmission line based on the chromatic dispersion characteristic and transmission line information (distance) of the front-stage optical transmission line of the optical repeater 200 and calculates the chromatic dispersion amount accumulated in the rear-stage optical transmission line based on the chromatic dispersion characteristic and transmission line information of the rear-stage optical transmission line of the optical repeater 200. Note that in this example, the chromatic dispersion compensation amount calculation portion 130 determines the chromatic dispersion compensation amount based on the chromatic dispersion characteristics and transmission line information, since the chromatic dispersion characteristic corresponds to wavelength information, the chromatic dispersion compensation amount may be determined based on wavelength information and transmission line information. In other words, the chromatic dispersion compensation amount calculation portion 130 may determine the chromatic dispersion compensation amount in the plurality of optical repeaters 200 comprising the path based on wavelength information and transmission line information in the path.

Next, the phase conjugation determination portion 140 of the control device 100 determines the optimal phase conjugation process in the optical repeater 200 (S104). The phase conjugation determination portion 140 determines the optimal phase conjugation process in the optical repeater 200 based on the number of optical paths between the transmitting end station device 30 and the receiving end station device 40 in the optical network 50 and the number of optical repeater 200 devices.

Next, the control device 100 notifies each optical repeater 200 of the wavelength information for the determined wavelength, phase conjugation processing information, and optimal chromatic dispersion compensation amount (S105). The control device 100 notifies the optical repeater 200 of the reception wavelength information and transmission wavelength information determined in S101, the optimal phase conjugation processing information determined in S104, and the optimal chromatic dispersion compensation amount determined in S103.

Next, the node control portion 202 of the optical repeater 200 sets the wavelength of the wavelength information, the phase conjugation processing information, and the optimal chromatic dispersion compensation amount notified by the control device 100 (S106). The node control portion 202 sets the wavelength of the acquired reception wavelength information to the reception light source 240, the wavelength of the acquired transmission wavelength information to the transmission light source 250, the acquired phase conjugation processing information to the phase conjugation processing portion 232, and the acquired optimal chromatic dispersion compensation amount to the chromatic dispersion compensation portion 231.

Next, the optical repeater 200 performs wavelength conversion, phase conjugation processing, and chromatic dispersion compensation (S107). The reception light source 240 generates a local oscillator light r1 of the set wavelength (frequency) and the transmission light source 250 generates a transmission light r2 of the set wavelength, thereby performing wavelength conversion in the optical transmitter/receiver 201. The phase conjugation processing portion 232 performs the phase conjugation processing by phase conjugation, and the chromatic dispersion compensation portion 231 performs the chromatic dispersion compensation processing based on the set compensation amount by performing digital signal processing on the signal after the phase conjugation processing.

Figure 11B:
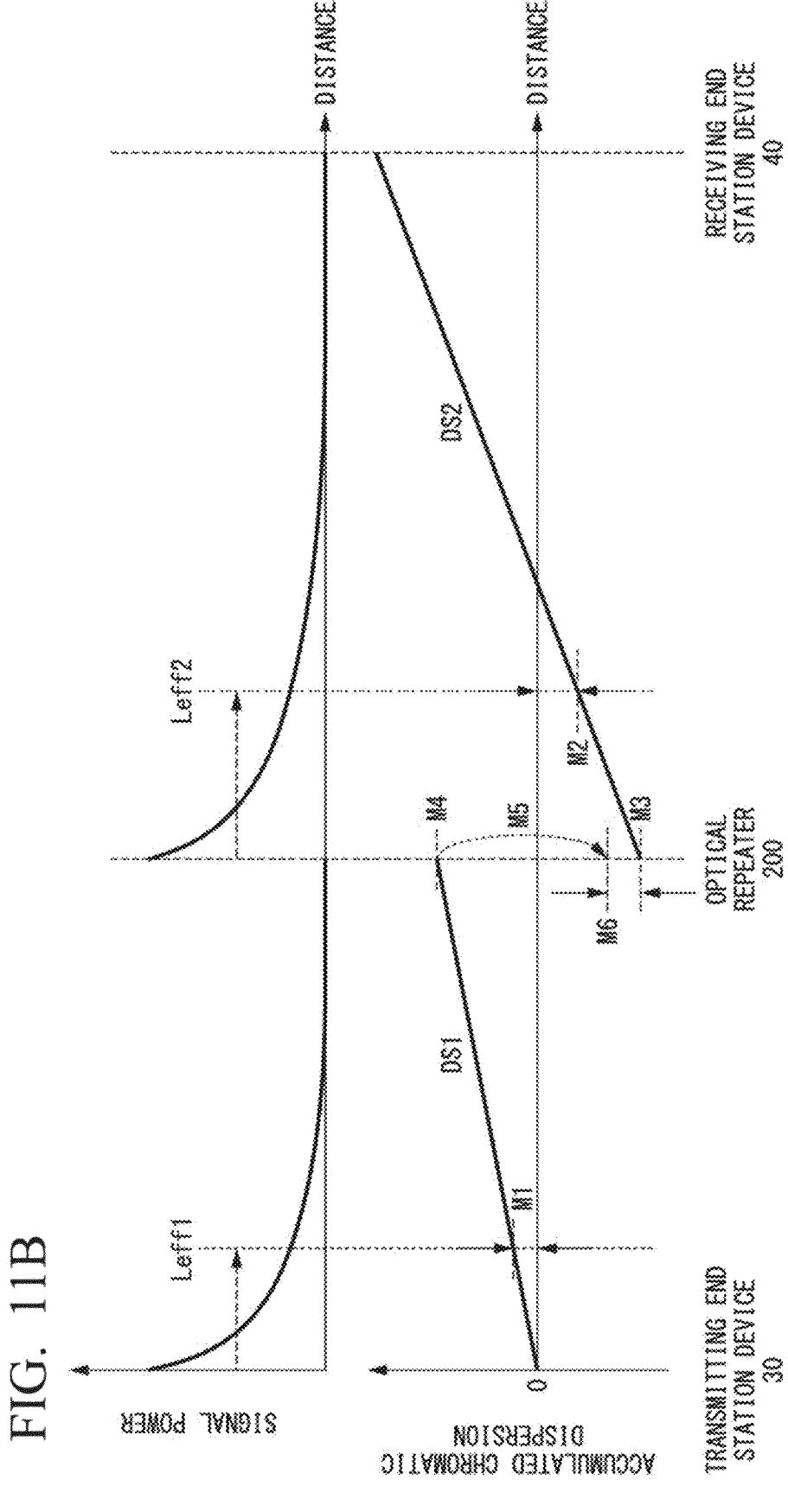
FIG. 11B is a diagram that shows a specific example of chromatic dispersion compensation by the control method according to the first example embodiment.

FIGS. 11A and 11B show specific examples of phase conjugation processing and chromatic dispersion compensation processing by the control method of this example embodiment. In the present example embodiment, phase conjugation processing is performed in the optical repeater 200 on the nonlinear distortion accumulated in the front-stage optical transmission line in the optical signal received by the optical repeater 200. This allows the nonlinear distortion in the transmission of optical signals transmitted from the optical repeater 200 in the rear-stage optical transmission line to be cancelled out at the receiving end. To achieve this effect, the optical repeater 200 in the present example embodiment determines the optimal chromatic dispersion compensation amount such that the nonlinear distortion cancellation effect is maximized. The optimal chromatic dispersion compensation amount in this example is the compensation amount calculated based on the chromatic dispersion amount in the front-stage transmission line and the rear-stage transmission line for the optical repeater 200.

As shown in FIG. 11A, in this example, one optical repeater 200 is located on the path between the transmitting end station device 30 and the receiving end station device 40. The transmitting end station device 30 and the optical repeater 200 are connected via the optical transmission line 3a (first optical transmission line), and the optical repeater 200 and the receiving end station device 40 are connected via the optical transmission line 3b (second optical transmission line). For example, the distance L1 of optical transmission line 3a and the distance L2 of optical transmission line 3b are different; with the distance L2 of the optical transmission line 3b being longer than the distance L1 of the optical transmission line 3a, but they may also be the same distance. Optical signals of wavelength λ1 are transmitted in the optical transmission line 3a, and optical signals of wavelength 22 are transmitted in the optical transmission line 3b. For example, wavelengths λ1 and 22 may both be in the C-band wavelength band, or they may be different, such as C-band and L-band wavelength bands, respectively, or they may both be in the L-band wavelength band. The optical repeater 200 converts the optical signal of the received wavelength λ1 into an optical signal of wavelength λ2, and transmits the converted optical signal of the converted wavelength 12.

As shown in FIG. 11B, since the wavelength of the optical signal is λ1 in the front-stage optical transmission line 3a, the chromatic dispersion compensation amount calculation portion 130 of the control device 100 determines the slope DS1 of the chromatic dispersion amount in the optical transmission line 3a according to the wavelength λ1. The slope DS1 of the chromatic dispersion amount in the optical transmission line 3a may be read from a database or other storage means. The chromatic dispersion compensation amount calculation portion 130 of the control device 100 uses the slope of the chromatic dispersion amount DS1 and the effective nonlinear distance Leff1 in the optical transmission line 3a to obtain the accumulated chromatic dispersion amount M1 (=DS1×Leff1) at the effective nonlinear distance Leff1 in the front-stage optical transmission line 3a. Since nonlinear effects are effects that depend on the optical signal intensity, and the optical intensity in a transmission line decreases according to an exponential form characterized by a propagation loss constant, it is sufficient to consider nonlinear effects only in regions of high optical intensity. The effective nonlinear distance Leff is defined as the distance at which nonlinear effects are considered, and Leff is given by the following Equation (2) using the length L and the propagation loss constant α in the optical fiber.

$$Leff = \frac{1 - e^{-\alpha L}}{2\alpha} \tag{2}$$

Since the wavelength of the optical signal in the rear-stage optical transmission line 3b is λ2, the chromatic dispersion compensation amount calculation portion 130 of the control device 100 determines the slope DS2 of the chromatic dispersion amount in the optical transmission line 3b according to the wavelength 22. The slope DS2 of the chromatic dispersion amount in optical transmission line 3b may be read from a database or other storage method. The chromatic dispersion compensation amount calculation portion 130 of the control device 100 calculates the accumulated chromatic dispersion amount M2 at the effective nonlinear distance Leff2 in the rear-stage optical transmission line 3b as M2=−M1 on the condition having a different sign from the accumulated chromatic dispersion amount M1 at the effective nonlinear distance Leff1 in the front-stage optical transmission line 3a. The chromatic dispersion compensation amount calculation portion 130 then finds the accumulated chromatic dispersion amount M3 in the transmission signal of the optical repeater. M3 can be calculated by M3=M2+DS2×Leff2=DS1×Leff1+DS2×Leff2.

The chromatic dispersion compensation amount calculation portion 130 of the control device 100 then calculates the accumulated chromatic dispersion compensation amount M5 for the optical repeater 200 to compensate chromatic dispersion using phase conjugation by M5=M4×2.

The chromatic dispersion compensation amount calculation portion 130 of the control device 100 calculates the difference M6 between the accumulated chromatic dispersion amount M3 and the accumulated chromatic dispersion compensation amount M5, and transmits the difference M6 to the optical repeater 200 as the optimal chromatic dispersion compensation amount. The control device 100 also transmits control information including instructions to implement the phase conjugation processing to the optical repeater 200. As a result, the node control portion 202 of the optical repeater 200 instructs the phase conjugation processing portion 232 to perform the phase conjugation processing operation based on the control information including the acquired instruction to perform the phase conjugation processing, as explained using FIGS. 9 and 10. The phase conjugation processing portion 232 performs phase conjugation processing operations. The node control portion 202 of the optical repeater 200 sets the chromatic dispersion compensation amount M6 notified by the control device 100 to the chromatic dispersion compensation portion 231 in the digital signal processing portion 230, as described using FIG. 9. In other words, when the chromatic dispersion compensation portion 231 is configured with an FDE as shown in FIG. 9, the node control portion 202 sets the transfer function coefficient of the inverse transfer function multiplication portion 413 in FIG. 9 according to the chromatic dispersion compensation amount M6 notified from the control device 100. As a result, the optical repeater 200, for the rear-stage optical transmission line 3b, calculates the accumulated chromatic dispersion M3 (M3=M4−M5−M6) after calculation of the accumulated chromatic dispersion compensation amount M5 using the phase conjugation processing of the phase conjugation processing portion 232 and the chromatic dispersion compensation using the chromatic dispersion compensation amount M6 of the chromatic dispersion compensation portion 231, and outputs an optical signal that is the accumulated chromatic dispersion M3 (FIG. 11B). This suppresses nonlinear effects in the receiving end station device 40.

The optical repeater 200 can calculate the accumulated chromatic dispersion amount M3 without phase conjugation by M3=M2+DS2×Leff2=DS1×Leff1+DS2×Leff2. Accordingly, the chromatic dispersion compensation portion 231 of the optical repeater 200 may calculate the accumulated chromatic dispersion amount M3 and output an optical signal that is the accumulated chromatic dispersion M3 without phase conjugation (FIG. 11B).

Figure 11C:
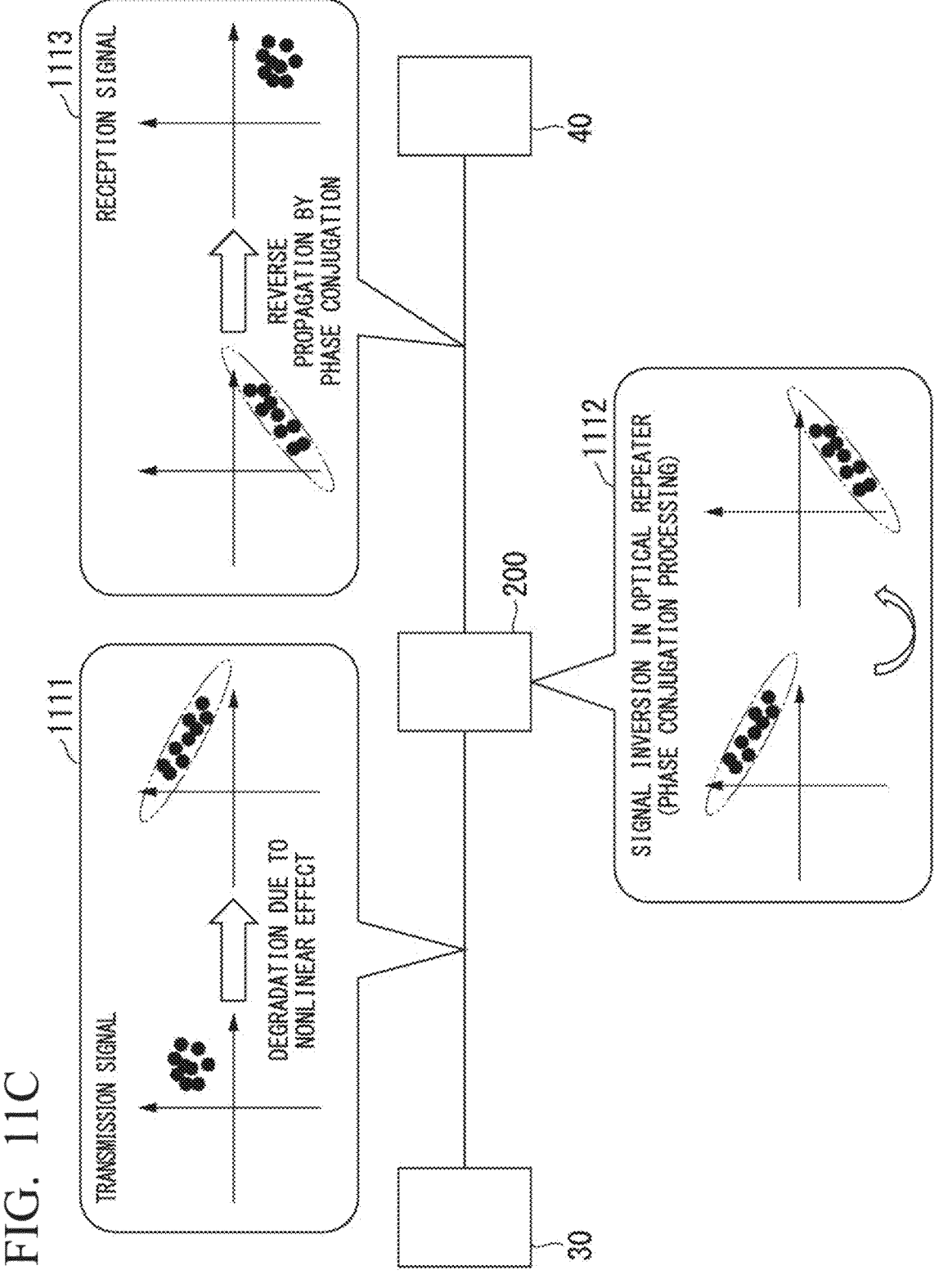
FIG. 11C is a diagram that shows an overview of phase conjugation processing according to the first example embodiment.

FIG. 11C is a diagram showing an overview of the phase conjugation process.

As shown in FIG. 11C, at a certain span in the optical network 51 (between network devices such as the transmitting station end device 30 and the optical repeater 200 in FIG. 11C), nonlinear distortion of the transmitted signal occurs as signal degradation due to nonlinear effects (1111 in FIG. 11C). Phase conjugation processing (inversion of the optical signal) is performed at the optical repeater 200. This enables the phase conjugation to be used to cancel out nonlinear distortion in the span after the optical repeater 200 (between the optical repeater 200 and the receiving end station device 40), thereby reducing signal degradation (nonlinear distortion) at the receiving end station device 40. In addition to this, chromatic dispersion compensation can be used to maximize the cancellation effect of nonlinear distortion at the receiving end station device 40.

The aforementioned processing in the control device 100 is an example aspect of processing that determines the chromatic dispersion compensation amount for compensation in the optical repeater 200 based on the wavelength information of the optical signal transmitted and received by the optical repeater 200 that is included in the optical network in the optical network path and the transmission line information of the optical transmission line connected to the optical repeater 200, and determines the phase conjugation processing in the optical repeater 200 based on the wavelength information and transmission line information.

Some of the processing in the control device 100 is an example aspect of processing that transmits to the optical repeater 200 an instruction to perform phase conjugation processing to calculate the complex conjugation of the optical signal concerned based on the accumulated chromatic dispersion amount M4 of the optical signal received by the optical repeater 200.

Some of the processing in the control device 100 is an example aspect of processing that calculates the first accumulated chromatic dispersion amount M1 at a first effective nonlinear distance (Leff1) with reference to the transmission-side network device in a first optical transmission line (front-stage path) between a transmission-side network device that transmits an optical signal received by the optical repeater 200 among the optical transmission lines to which the optical repeater 200 is connected.

Some of the processing in the control device 100 is an example aspect of processing that calculates a second accumulated chromatic dispersion amount (M2) at a second effective nonlinear distance (Leff2) with reference to the own device of the optical signal in the second optical transmission line (rear-stage path) between the reception-side network device of the optical signal transmitted by the optical repeater 200 among the optical transmission lines to which the optical repeater 200 is connected, the second accumulated chromatic dispersion amount having the opposite sign of the first accumulated chromatic dispersion amount.

Some of the processing in the control device 100 is an example aspect of processing that calculates the chromatic dispersion compensation amount (M6), which indicates the difference between the chromatic dispersion amount (M3) during transmission of an optical signal in the optical repeater 200 when the accumulated chromatic dispersion amount of an optical signal becomes the second accumulated chromatic dispersion amount (M2) at the second effective nonlinear distance (Leff2) based on a statistical value of the transition of the accumulated chromatic dispersion amount of an optical signal according to the distance in a second optical transmission line and the accumulated chromatic dispersion amount (M5) resulting from complex conjugation.

The processing of the optical repeater 200 described above is an example aspect of processing that performs chromatic dispersion compensation processing on an electrical signal based on a received optical signal, based on the chromatic dispersion compensation amount (M6), and phase conjugation processing on an electrical signal based on a received optical signal, based on phase conjugation processing information acquired from the control device 100.

Some of the processing described above in the optical repeater 200 is an example aspect of processing that performs phase conjugation processing based on the accumulated chromatic dispersion amount of an optical signal received by the own device and an instruction to perform phase conjugation processing in order to calculate the complex conjugation of the optical signal.

Some of the processing in the optical repeater 200 described above is an example aspect of processing to determine the chromatic dispersion amount (M3) of an optical signal transmitted to the reception-side network device, based on the chromatic dispersion amount (M5), which is the result of the complex conjugation after the phase conjugation processing, and the chromatic dispersion compensation amount (M6) acquired from the control device 100.

Figure 12:
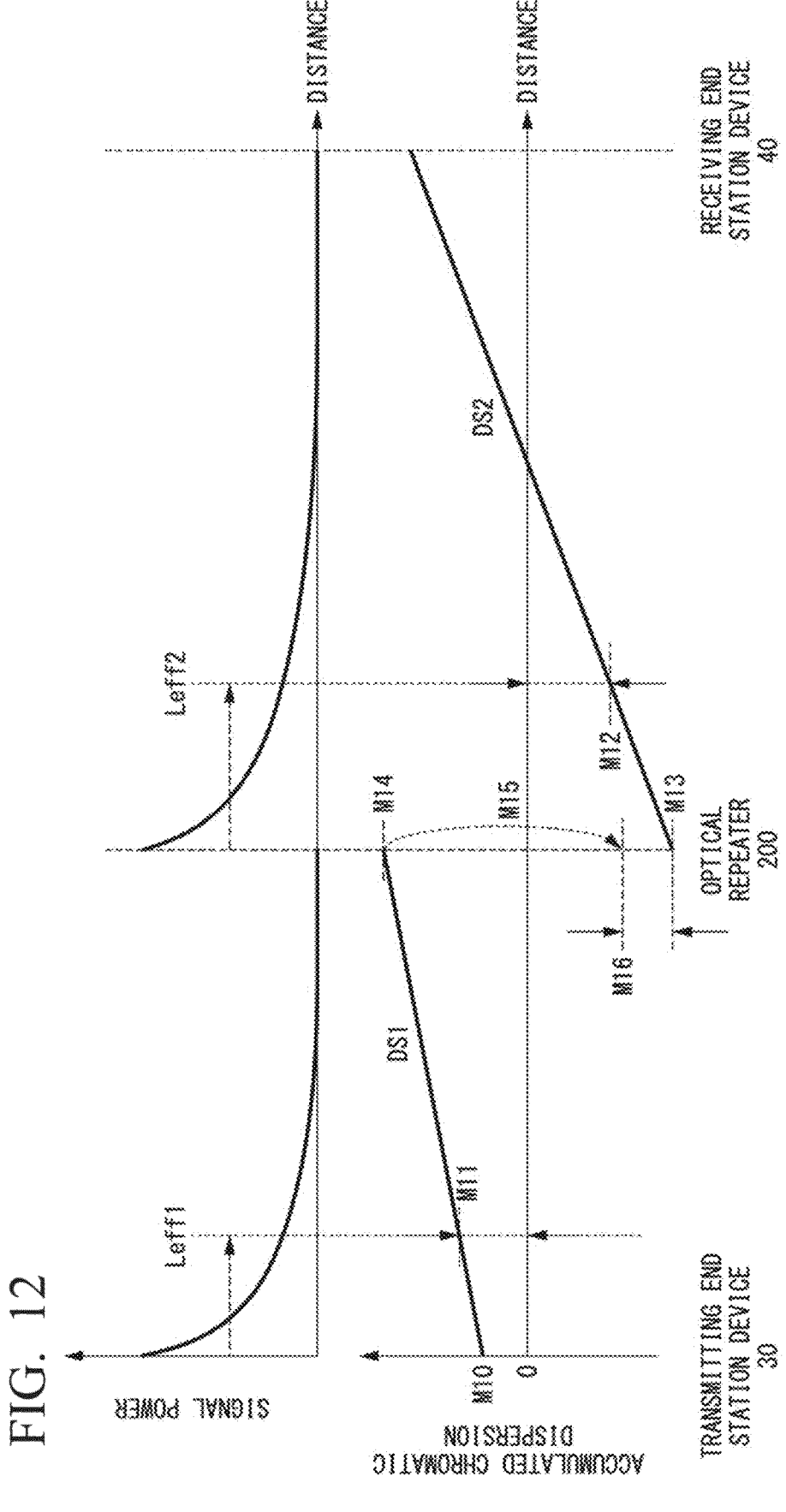
FIG. 12 is a diagram that shows a specific example of chromatic dispersion compensation by the control method according to the first example embodiment.

FIG. 12 shows another example of the chromatic dispersion compensation amount obtained by the control method in the present example embodiment. Unlike FIG. 11B, in this example, the transmitting end station device 30 transmits an optical signal with an accumulated chromatic dispersion amount M10 to the optical transmission line 3a, as shown in FIG. 12. When the transmitting end station device 30 is an optical repeater 200 or the like in the optical network 51, dispersion such as the accumulated chromatic dispersion amount M10 may occur in an optical signal transmitted by the transmitting end station device 30 in this manner.

As shown in FIG. 12, since the wavelength of the optical signal is λ1 in the front-stage optical transmission line 3a of the optical repeater 200, the control device 100 determines the slope DS1 of the chromatic dispersion amount in the optical transmission line 3a according to the wavelength λ1. The control device 100 uses the effective nonlinear distance Leff1 to determine the accumulated chromatic dispersion amount M11 (=DS1×Leff1+M10) at the effective nonlinear distance Leff1 in the front-stage optical transmission line 3a.

Since the wavelength of the optical signal in the rear-stage optical transmission line 3b is λ2, the control device 100 determines the slope DS2 of the chromatic dispersion amount in the optical transmission line 3b according to the wavelength 22. The control device 100 determines the accumulated chromatic dispersion amount M13 in the transmitted signal of the optical repeater (=DS1×Leff1+DS2×Leff2+M10) in the transmission signal of the optical repeater as the condition that the accumulated chromatic dispersion amount M12 at the effective nonlinear distance Leff2 in the rear-stage optical transmission line 3b is different in sign from the accumulated chromatic dispersion amount M11 at the effective nonlinear distance Leff1 in the front-stage optical transmission line 3a. The control device 100 determines the phase conjugation compensation amount M15 (=M14×2), which is compensated by the phase conjugation in the optical repeater 200.

The control device 100 finds the difference M16 between M13 and M15, and sets M6 as the optimal chromatic dispersion compensation amount to the optical repeater 200. The control device 100 performs the setting to the optical repeater 200 so as to perform phase conjugation processing.

As described above, in the optical repeater that performs wavelength conversion on a channel-by-channel basis in the present example embodiment, the analog signal output from the optical receiving front end is converted to a digital signal by an ADC, and after digital signal processing, is converted again to an analog signal by a DAC before being relayed back to the optical transmission front end. At this point, within the digital signal processing portion, the chromatic dispersion distortion that occurs in the optical fiber transmission line is compensated according to the phase conjugation processing and the length of the network path (transmission line).

Specifically, the optimal chromatic dispersion compensation amount for compensation at the optical repeater is determined at the control device 100 so that the accumulated chromatic dispersion amount at the effective nonlinear distance in the front-stage transmission line and the accumulated wavelength amount at the effective nonlinear distance in the rear-stage transmission line have different signs, and chromatic dispersion compensation is performed using the optimal chromatic dispersion compensation amount determined by phase conjugation in the optical repeater. This allows the nonlinear distortion accumulated in the front-stage optical transmission line at the receiving end of the optical repeater to be offset by the optical transmission in the rear-stage optical transmission, thereby maximizing the effect of suppressing nonlinear distortion at the receiving end station equipment. Furthermore, as shown in FIG. 12, even when an excess dispersion amount is included in the transmission signal by the transmitting end station device, the optical repeater can set an appropriate chromatic dispersion amount to compensate for the nonlinear distortion.

Second Example Embodiment

Figure 13A:
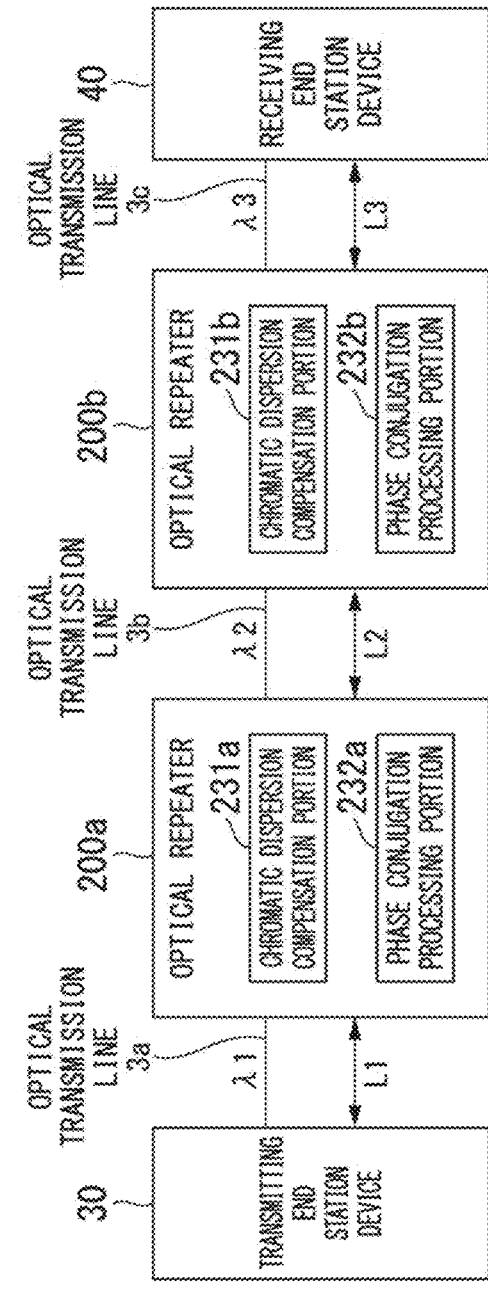
FIG. 13A is a diagram that shows a specific example of chromatic dispersion compensation by the control method according to the second example embodiment.
Figure 13B:
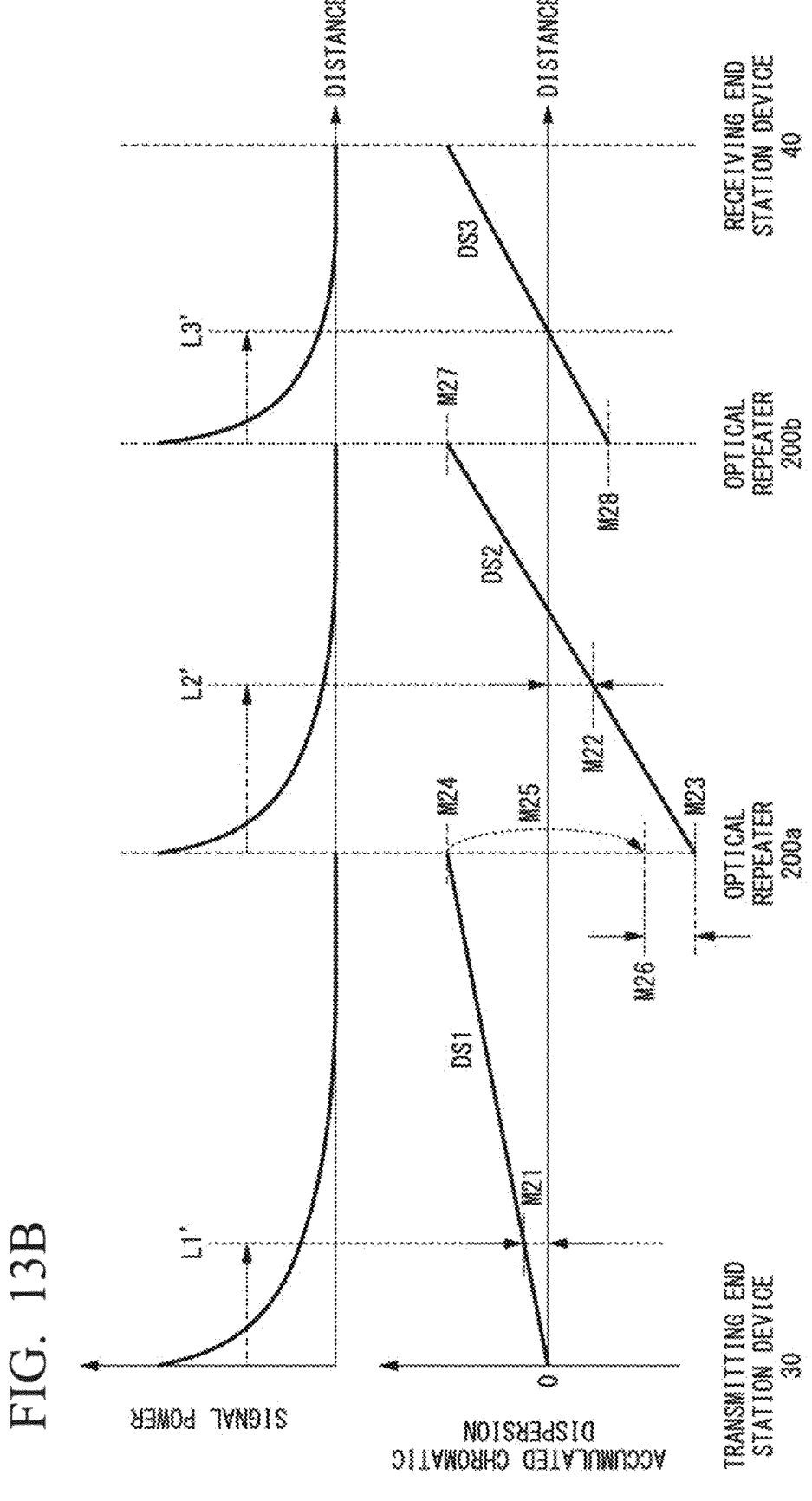
FIG. 13B is a diagram that shows a specific example of chromatic dispersion compensation by the control method according to the second example embodiment.

Next, the second example embodiment shall be explained with reference to the drawings. The configuration and basic operation of the optical network system is the same as in the first example embodiment. FIGS. 13A and 13B show specific examples of the chromatic dispersion compensation amount by the control method in this example embodiment. This example embodiment describes an example when the number of spans in the optical network is an odd number of three or more, especially when the number of spans is three.

As shown in FIG. 13A, an optical repeater 200a (first optical repeater) and optical repeater 200b (second optical repeater) are located on the path route between the transmitting end station device 30 and the receiving end station device 40. The transmitting end station device 30 and the optical repeater 200a are connected via the optical transmission line 3a (first optical transmission line), the optical repeater 200a and the optical repeater 200b are connected via the optical transmission line 3b (second optical transmission line), and the optical repeater 200b and the receiving end station device 40 are connected via the optical transmission line 3c (third optical transmission line). For example, the distance L1 of the optical transmission line 3a, L2 of the optical transmission line 3b, and L3 of the optical transmission line 3c may be different or the same distance. Optical signals of wavelength λ1 are transmitted in the optical transmission line 3a, optical signals of wavelength λ2 are transmitted in the optical transmission line 3b, and optical signals of wavelength λ3 are transmitted in the optical transmission line 3c.

When the total number of spans is an odd number of three or more, such as three or more total spans in the second example embodiment, for example, the control of the control device 100 using the method of the first example embodiment is applied to the combination of every two spans, such as optical transmission line 3a and optical transmission line 3b, and for one optical transmission line 3 such as the remaining optical transmission line 3c, the control device 100 sets the optimum dispersion compensation amount that can suppress nonlinear distortion when optically transmitting over the one span in that optical transmission line 3 (optical transmission line 3c in this example embodiment) to the last optical repeater 200 (optical repeater 200b in this example embodiment) that is included in the optical network 51.

As shown in FIG. 13B, the optical repeater 200a performs phase conjugation processing and calculation of the chromatic dispersion compensation amount M26 applying the first example embodiment based on control by the control device 100. The chromatic dispersion amount M26 after compensation in the optical repeater 200a is determined by the same method as in the first example embodiment. The control device 100 sets the dispersion compensation amount M26 obtained by applying the first example embodiment to the optical repeater 200a to the optical repeater 200a. The control device 100 also performs a setting to the optical repeater 200a to perform phase conjugation processing.

The optical repeater 200B also compensates the optimum chromatic dispersion compensation amount to minimize nonlinear effects in one span of optical transmission in the optical transmission line 3c, based on the control of the control device 100. The control device 100 determines the slope DS3 of the chromatic dispersion amount in the optical transmission line 3c according to the wavelength λ3. The control device 100 determines the chromatic dispersion M28 (=DS3×L3') of the transmission signal of the optical repeater 200b on the condition that the accumulated chromatic dispersion at the effective nonlinear distance L3' is zero for the transmission signal in the optical transmission line 3c. The control device 100 determines the accumulated chromatic dispersion amount M27 that accumulates in the optical transmission line 3b.

The control device 100 sets the chromatic dispersion to be compensated in the optical repeater 200c as M27+M28 from the obtained chromatic dispersion amounts M27 and M28. The control device 100 also sets the optical repeater 200C not to perform phase conjugation processing.

In the case where the total number of spans is an odd number of 5 or more, the control unit 100, as in the case of a total span number of 3 shown in the second example embodiment, identifies a combination consisting of one optical repeater and two optical transmission lines such that the first example embodiment can be implemented. The control device 100 sets the phase conjugation and optimal chromatic dispersion compensation according to the first example embodiment for each identified combination of optical repeaters. For the remaining one optical transmission line among the N spans, the control device 100 sets the optimum chromatic dispersion compensation amount that minimizes nonlinear distortion in one span of transmission to the optical repeater.

As described above, this method suppresses nonlinear distortion at the receiving end in the case of many spans, especially in the case of an odd number of spans. Specifically, a combination consisting of one optical repeater and two optical transmission lines is set so that the first example embodiment can be implemented, and phase conjugation and chromatic dispersion compensation according to the first example embodiment are set for the optical repeater in each combination. For the remaining optical transmission lines, the optimal chromatic dispersion compensation amount shown in the second example embodiment is set so that the nonlinear distortion is minimized in one span. Therefore, the cancellation effect of nonlinear distortion during optical transmission using chromatic dispersion compensation in an optical network consisting of an odd number of multiple transmission lines can be maximized and the signal quality at the receiving end can be improved.

Third Example Embodiment

Figure 14A:
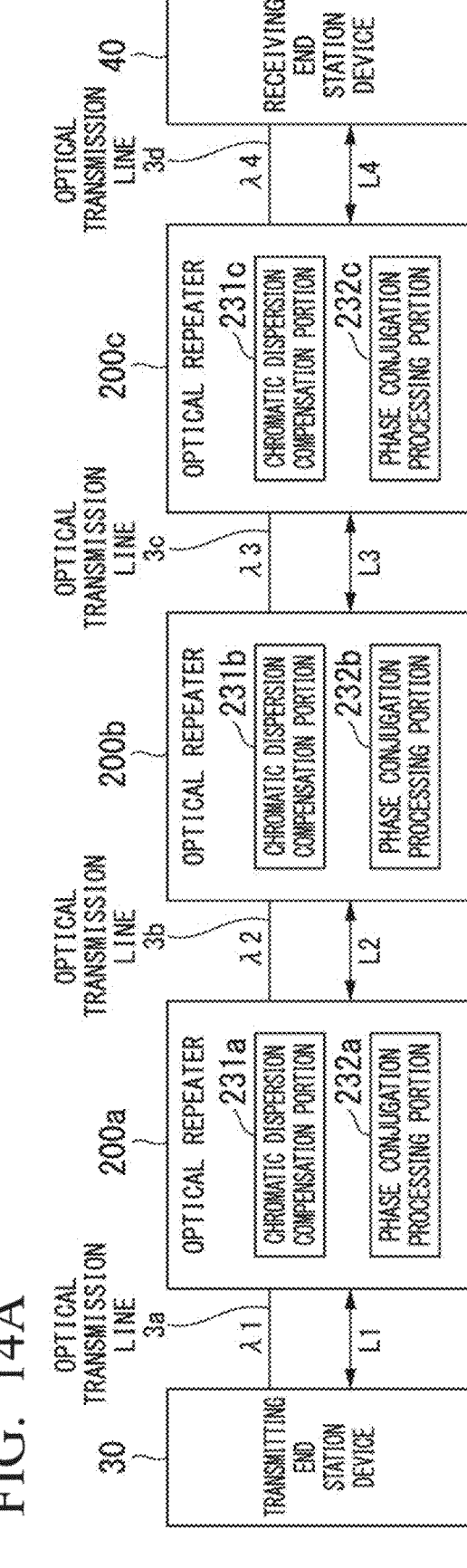
FIG. 14A is a diagram that shows a specific example of chromatic dispersion compensation by the control method according to the third example embodiment.
Figure 14B:
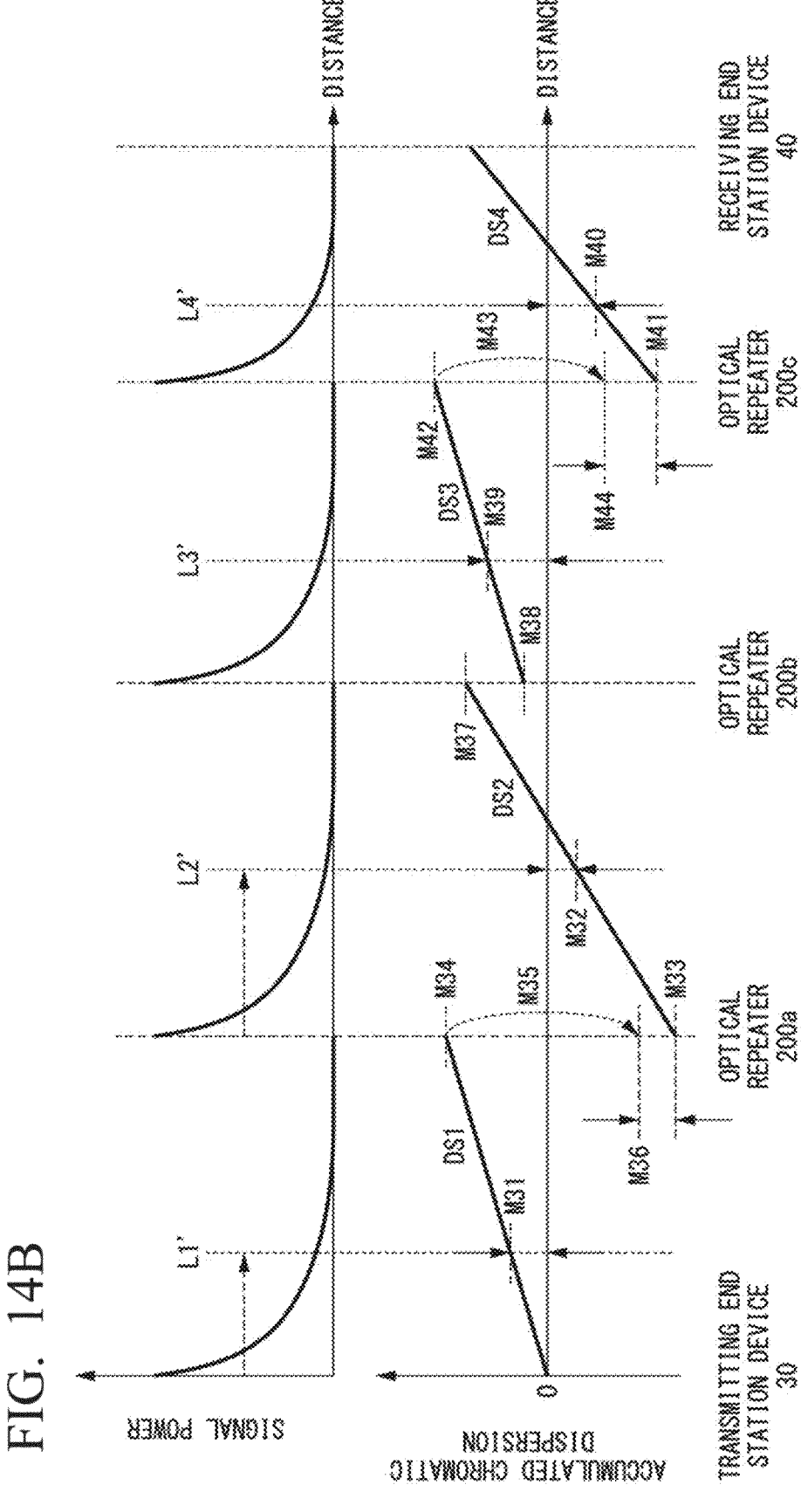
FIG. 14B is a diagram that shows a specific example of chromatic dispersion compensation by the control method according to the third example embodiment.

Next, the third example embodiment shall be explained with reference to the drawings. The configuration and basic operation of the optical network system is the same as in the first example embodiment. FIGS. 14A and 14B show specific examples of the chromatic dispersion compensation amount by this control method. The present example embodiment describes an example when the number of spans in the optical network is an even number of four or more, with the number of spans in the example being four.

As shown in FIG. 4A, the optical repeater 200a (first optical repeater), the optical repeater 200b (second optical repeater), and an optical repeater 200c are located on the path route between the transmitting end station device 30 and the receiving end station device 40. The transmitting end station device 30 and the optical repeater 200a are connected via the optical transmission line 3a (first optical transmission line), the optical repeater 200a and the optical repeater 200b are connected via the optical transmission line 3b (second optical transmission line), the optical repeater 200b and the optical repeater 200c are connected via the optical transmission line 3c (third optical transmission line) and the optical repeater 200b and the receiving end station device 40 are connected via the optical transmission line 3d (fourth optical transmission line). For example, the distance L1 of the optical transmission line 3a, distance L2 of the optical transmission line 3b, distance L3 of the optical transmission line 3c, and distance L4 of the optical transmission line 3d may be different or the same distance. Optical signals of wavelength λ1 are transmitted in the optical transmission line 3a, optical signals of wavelength λ2 are transmitted in the optical transmission line 3b, optical signals of wavelength λ3 are transmitted in the optical transmission line 3c, and optical signals of wavelength λ4 are transmitted in the optical transmission line 3d. These light wavelengths λ1 to λ4 may be the same or different for two or more wavelengths A.

As shown in FIG. 14B, in the case of the total number of spans of 4 in the third example embodiment, for example, the control of the control device 100 according to the first example embodiment is applied to the two spans of the optical transmission lines 3a and the optical transmission line 3b, and the control of the control device 100 according to the first example embodiment is applied to the two spans of the optical transmission line 3c and the optical transmission line 3d.

The control device 100 sets the dispersion compensation amount that applies the control of the control device 100 according to the first example embodiment and the information to perform the phase conjugation process to the optical repeater 200a. In other words, the control device 100 sets the optimum chromatic dispersion compensation amount M36 obtained by applying the control by the control device 100 of the first example embodiment to the optical repeater 200a. The control device 100 also sets the optical repeater 200a to perform phase conjugation processing as in the first example embodiment.

The control device 100 also sets the dispersion compensation amount that applies the control of the control device 100 according to the first example embodiment and the information to perform the phase conjugation process to the optical repeater 200c. In other words, the control device 100 sets the optimum chromatic dispersion compensation amount M44 obtained by applying the control by the control device 100 of the first example embodiment to the optical repeater 200c. The control device 100 also sets the optical repeater 200c to perform phase conjugation processing as in the first example embodiment.

The control device 100 determines the slope DS2 of the chromatic dispersion amount in the optical transmission line 3b according to the wavelength λ2. The control device 100 determines the accumulated chromatic dispersion amount M37 (=DS2×L2+M33) that accumulates in the optical transmission line 3b.

The control device 100 sets the chromatic dispersion amount to be compensated by the optical repeater 200b as M37-M38 from the determined chromatic dispersion amount M37 and the dispersion amount M38 smaller than M37 that the transmission signal in the optical transmission line 3c has. The control device 100 also sets the optical repeater 200B not to perform phase conjugation processing.

In the case where the total number of spans is an even number of 6 or more, the control unit 100, as in the case of a total span number of 4 shown in the third example embodiment, identifies a combination consisting of one optical repeater and two optical transmission lines such that the first example embodiment can be implemented. The control device 100 sets the phase conjugation and optimal chromatic dispersion compensation according to the first example embodiment for each combination of optical repeaters.

As described above, this method compensates nonlinear distortion at the receiving end in the case of many spans, especially in the case of an even number of spans. Specifically, a combination consisting of one optical repeater and two optical transmission lines is set so that the first example embodiment can be implemented, and phase conjugation and chromatic dispersion compensation according to the first example embodiment are set for the optical repeater in each combination. Therefore, the cancellation effect of nonlinear distortion during optical transmission using chromatic dispersion compensation in an optical network consisting of an even number of multiple transmission lines can be maximized and the signal quality at the receiving end can be improved.

Figure 15:
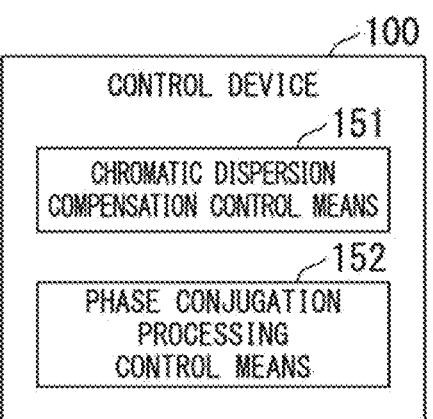
FIG. 15 is a diagram that shows the minimum configuration of the control unit according to one example embodiment of the present disclosure.

FIG. 15 shows the minimum configuration of the control device.

Figure 16:
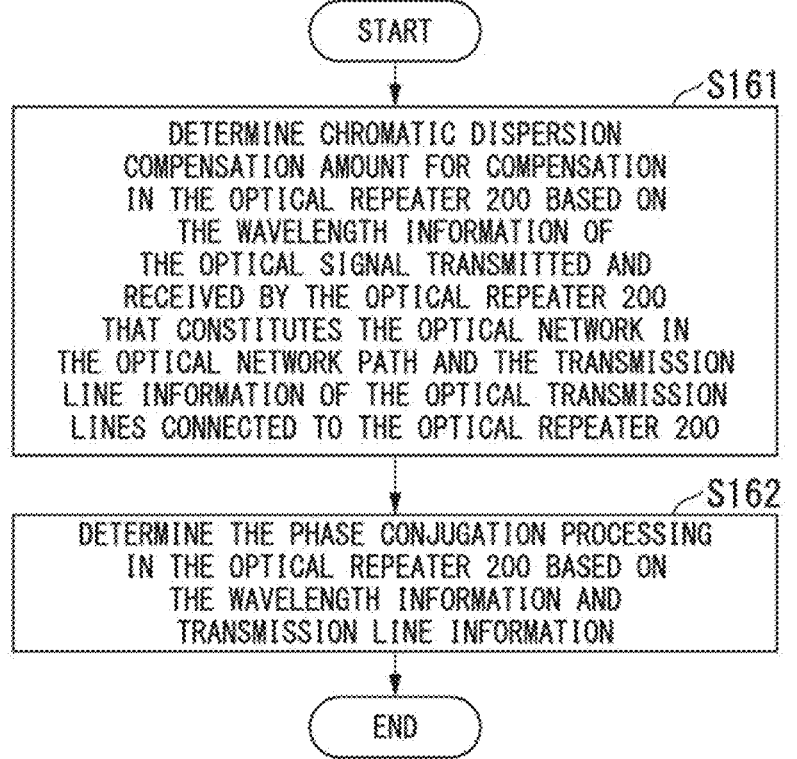
FIG. 16 is a diagram that shows the processing flow by the control device of the minimum configuration of one example embodiment of the present disclosure.

FIG. 16 shows the processing flow by the control device with the minimum configuration.

The control device 100 includes at least a chromatic dispersion compensation control means 151 and a phase conjugation processing control means 152.

The chromatic dispersion compensation control means 151 determines the chromatic dispersion compensation amount for compensation in the optical repeater 200 based on the wavelength information of the optical signal transmitted and received by the optical repeater 200 that is included in the optical network in the optical network path and the transmission line information of the optical transmission lines connected to the optical repeater 200 (Step S161).

The phase conjugation processing control means 152 determines the phase conjugation processing in the optical repeater 200 based on the wavelength information and transmission line information (Step S162).

Figure 17:
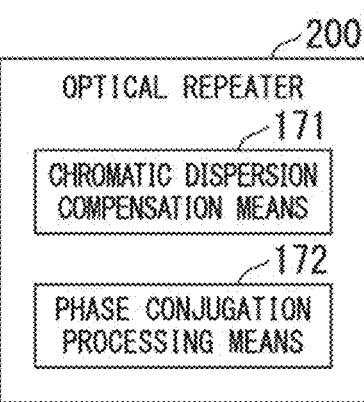
FIG. 17 is a diagram that shows the minimum configuration of an optical repeater in one example embodiment of the present disclosure.

FIG. 17 shows the minimum configuration of the optical repeater.

Figure 18:
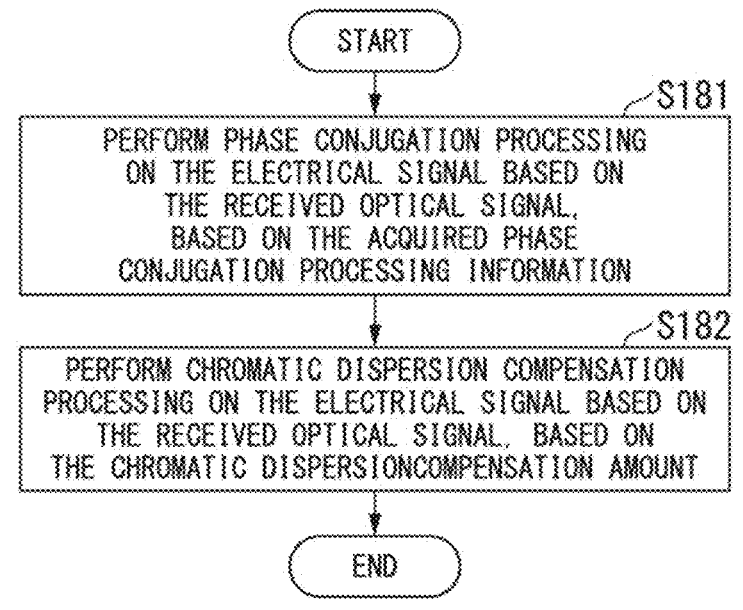
FIG. 18 is a diagram that shows the processing flow by the optical repeater of the minimum configuration of one example embodiment of the present disclosure.

FIG. 18 shows the processing flow by the optical repeater with the minimum configuration.

The optical repeater 200 includes at least a chromatic dispersion compensation means 171 and a phase conjugation processing means 172.

The phase conjugation processing means 172 performs phase conjugation processing on the electrical signal based on the received optical signal, based on the acquired phase conjugation processing information (Step S181).

The chromatic dispersion compensation means 171 performs chromatic dispersion compensation processing on the electrical signal based on the received optical signal, based on the chromatic dispersion compensation amount (Step S182).

In other example embodiments, the optical repeater 200 may perform some or all of the processing of the control device 100.

Figure 19:
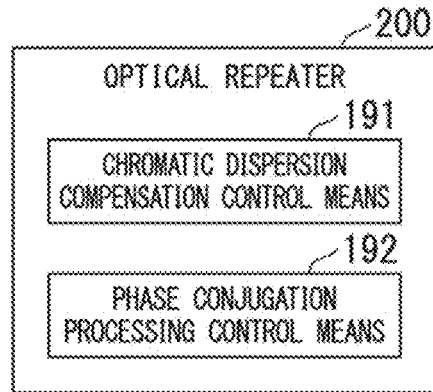
FIG. 19 is a diagram that shows another configuration of an optical repeater of one example embodiment of the present disclosure.

FIG. 19 shows another configuration of the optical relay system.

FIG. 20 shows the processing flow by an optical repeater in another configuration.

In addition to the chromatic dispersion compensation means 171 and phase conjugation processing means 172, in another example embodiment, the optical repeater 200 may further include a chromatic dispersion compensation control means 191 and a phase conjugation processing control means 192, as shown in FIG. 19.

The chromatic dispersion compensation control means 191 determines the chromatic dispersion compensation amount for compensation in the optical repeater 200 based on the wavelength information of the optical signal transmitted and received by the own device that is included in the optical network in the optical network path (optical repeater

200), and the transmission line information of the optical transmission lines connected to the optical repeater 200 (Step S2001).

The phase conjugation processing control means 192 determines the phase conjugation processing in the optical repeater 200 based on the wavelength information and transmission line information (Step S2002).

In this case, the chromatic dispersion compensation control means 191 and the phase conjugation processing control means 192 may perform the same processing as that of the control device 100 described above. In addition, when performing the processing of the chromatic dispersion compensation control means 191 and the phase conjugation processing control means 192, optical repeater 200 may acquire from the control device 100 information necessary for the processing in the same manner as the control device 100 as described above.

In addition to the configuration of the chromatic dispersion compensation means 171 and the phase conjugation processing means 172, the optical repeater 200 in another example embodiment may include at least one of the chromatic dispersion compensation control means 191 and the phase conjugation processing control means 192, with the remaining means being provided in the control device 100.

The control device, optical repeater, transmitting end station device, and receiving end station device in the above example embodiments are composed of hardware or software, or both, and may be composed of one piece of hardware or software, or multiple pieces of hardware or software. Each device (control device, etc.) and each function (processing) may be realized by a computer 60 having a processor 61 such as a Central Processing Unit (CPU) and a memory 62 as a storage device, as shown in FIG. 21. For example, a program for performing the method (control method, etc.) in the example embodiments may be stored in the memory 62, and each function may be realized by executing the program stored in the memory 62 by the processor 61.

These programs contain a set of instructions (or software code) that, when read into a computer, cause the computer to perform one or more of the functions described in the example embodiments. The program may be stored in a non-transient computer readable medium or a tangible storage medium. By way of example, not limitation, computer readable media or tangible storage media include random-access memory (RAM), read-only memory (ROM), flash memory, a solid-state drive (SSD) or other memory technology, CD-ROM, digital versatile disc (DVD), Blu-ray (registered trademark) discs or other optical disc storage, magnetic cassettes, magnetic tape, magnetic disk storage, or other magnetic storage devices. The program may be transmitted on a temporary computer-readable medium or a communication medium. By way of example, not limitation, a temporary computer readable or communication medium includes electrical, optical, acoustic, or other forms of propagation signals.

Some or all of the above example embodiments may also be described as, but not limited to, the following supplementary notes.

(Supplementary Note 1)

An optical network system comprising an optical repeater included in an optical network and a control device that controls the optical repeater, wherein the control device comprises:

a management means that manages wavelength information of optical signals transmitted and received by the optical repeater in a path of the optical network and transmission line information of optical transmission lines connected to the optical repeater;

a chromatic dispersion compensation control means that determines a chromatic dispersion compensation amount for compensation in the optical repeater based on the wavelength information and the transmission line information; and a phase conjugation processing control means that determines phase conjugation processing in the optical repeater based on the wavelength information and the transmission line information, and the optical repeater comprises:

a chromatic dispersion compensation amount acquisition means that acquires the determined chromatic dispersion compensation amount from the control device;

a phase conjugation processing acquisition means that acquires the determined phase conjugation processing information from the control device;

a phase conjugation processing means that performs phase conjugation processing on an electrical signal according to a received optical signal based on the acquired phase conjugation processing information; and a chromatic dispersion compensation means that performs chromatic dispersion compensation processing on an electrical signal according to a received optical signal based on the acquired chromatic dispersion compensation amount.

(Supplementary Note 2)

The optical network system according to Supplementary Note 1, wherein the chromatic dispersion compensation control means obtains an accumulated chromatic dispersion amount at the effective nonlinear distance in the reception-side optical transmission line of the optical repeater and an accumulated chromatic dispersion amount at the effective nonlinear distance in the transmission-side optical transmission line of the optical repeater, based on the reception-side wavelength information and transmission line information of the optical repeater and the transmission-side wavelength information and transmission line information of the optical repeater.

(Supplementary Note 3)

The optical network system according to Supplementary Note 2, wherein the chromatic dispersion compensation control means determines the chromatic dispersion compensation amount based on the accumulated chromatic dispersion amount at the effective nonlinear distance in the reception-side optical transmission line of the optical repeater, the accumulated chromatic dispersion amount at the effective nonlinear distance in the transmission-side optical transmission line of the optical repeater, and a chromatic dispersion compensation amount obtained by phase conjugation processing in the optical repeater.

(Supplementary Note 4)

The optical network system according to any one of Supplementary Note 1 to Supplementary Note 3, wherein the chromatic dispersion compensation control means determines the chromatic dispersion compensation amount based on an accumulated chromatic dispersion amount included in the transmission signal before optical transmission in the reception-side optical transmission line of the optical repeater, the accumulated chromatic dispersion amount at the effective nonlinear distance in the reception-side optical transmission line of the optical repeater, the accumulated chromatic dispersion amount at the effective nonlinear distance in the transmission-side optical transmission line of the optical repeater, and a chromatic dispersion compensation amount obtained by phase conjugation processing in the optical repeater.

(Supplementary Note 5)

The optical network system according to any one of Supplementary Note 1 to Supplementary Note 4, wherein the chromatic dispersion compensation amount is a compensation amount obtained on the condition that the accumulated chromatic dispersion amount at the effective nonlinear distance in the reception-side optical transmission line of the optical repeater and the accumulated chromatic dispersion amount at the effective nonlinear distance in the transmission-side optical transmission line of the optical repeater have different signs.

(Supplementary Note 6)

The optical network system according to Supplementary Note 1, wherein in an optical network comprising three or more odd-numbered paths connected via the optical repeater, the chromatic dispersion compensation control means and the phase conjugation processing control means determine the chromatic dispersion compensation amount and the phase conjugation processing in a target optical repeater based on the wavelength information and the transmission line information in the paths before and after the target optical repeater other than the optical repeater connected to the last path among the plurality of paths.

(Supplementary Note 7)

The optical network system according to any one of Supplementary Note 1 to Supplementary Note 6, wherein the chromatic dispersion compensation control means and the phase conjugation processing control means obtain, in the optical repeater, a combination of a set of two paths in the front and rear stages and one optical repeater relaying the paths and one extra path, and determine the optical repeater other than the optical repeater connected to the extra path as the target optical repeater.

(Supplementary Note 8)

The optical network system according to Supplementary Note 7, wherein the phase conjugation processing control means determines the phase conjugation processing in the optical repeater in the combination.

(Supplementary Note 9)

The optical network system according to either one of Supplementary Note 7 and Supplementary Note 8, wherein the chromatic dispersion compensation control means determines the chromatic dispersion compensation amount in the optical repeater of the combination based on the wavelength information and transmission line information in the two optical transmission lines of the combination.

(Supplementary Note 10)

The optical network system according to Supplementary Note 7, wherein the chromatic dispersion compensation control means determines the chromatic dispersion compensation amount in an optical repeater of the one extra path based on the wavelength information and transmission line information in the optical transmission line of the extra path.

(Supplementary Note 11)

The optical network system according to any one of Supplementary Note 7 to Supplementary Note 10, wherein the chromatic dispersion compensation amount is the compensation amount calculated on the condition that the accumulated chromatic dispersion at the effective nonlinear distance in the optical transmission line of the one extra path becomes zero.

(Supplementary Note 12)

The optical network system according to any one of Supplementary Note 7 to Supplementary Note 11, wherein in an optical network comprising four or more even-numbered paths connected via the optical repeater, the chromatic dispersion compensation control means and the phase conjugation processing control means determine the chromatic dispersion compensation amount and the phase conjugation processing in the optical repeater based on the wavelength information and the transmission line information in the paths before and after each optical repeater in a plurality of the paths.

(Supplementary Note 13)

The optical network system according to any one of Supplementary Note 1 to Supplementary Note 12, wherein the chromatic dispersion compensation control means and the phase conjugation processing control means obtain a combination of two optical transmission lines and one optical repeater as a pair in the optical repeater.

(Supplementary Note 14)

The optical network system according to any one of Supplementary Note 7 to Supplementary Note 13, wherein the phase conjugation processing control means determines the phase conjugation processing for the optical repeater in the combination.

(Supplementary Note 15)

The optical network system according to any one of Supplementary Note 7 to Supplementary Note 14, wherein the chromatic dispersion compensation control means determines the chromatic dispersion compensation amount in the optical repeater of the combination based on the wavelength information and transmission line information in the two optical transmission lines of the combination.

(Supplementary Note 16)

A control method manages wavelength information of optical signals transmitted and received by an optical repeater in a path of an optical network, transmission line information of optical transmission lines connected to the optical repeater, and the number of paths of the optical network; and determines a chromatic dispersion compensation amount for compensation and phase conjugation processing in the optical repeater based on the wavelength information, the transmission line information, and the number of paths in the optical network.

(Supplementary Note 17)

The control method according to Supplementary Note 16, determining the chromatic dispersion compensation amount and phase conjugation processing based on an accumulated chromatic dispersion amount at the effective nonlinear distance in the reception-side optical transmission line of each optical repeater in the optical network path and an accumulated chromatic dispersion amount at the effective nonlinear distance in the transmission-side optical transmission line of the optical repeater.

(Supplementary Note 18)

A control program for causing a computer to execute the processes of:

managing wavelength information of optical signals transmitted and received by an optical repeater in a path of an optical network, transmission line information of optical transmission lines connected to the optical repeater, and the number of paths of the optical network; and determines a chromatic dispersion compensation amount for compensation and phase conjugation processing in the optical repeater based on the wavelength information, the transmission line information, and the number of paths in the optical network.

(Supplementary Note 19)

The program according to Supplementary Note 18, determining the chromatic dispersion compensation amount and phase conjugation processing based on an accumulated chromatic dispersion amount at the effective nonlinear distance in the reception-side optical transmission line of each optical repeater in the optical network path and an accumulated chromatic dispersion amount at the effective nonlinear distance in the transmission-side optical transmission line of the optical repeater.

(Supplementary Note 20)

A control device comprising: a chromatic dispersion compensation control means that determines a chromatic dispersion compensation amount for compensation in an optical repeater based on wavelength information of optical signals transmitted and received by the optical repeater in a path of an optical network, and transmission line information of optical transmission lines connected to the optical repeater; and a phase conjugation processing control means that determines phase conjugation processing in the optical repeater based on the wavelength information and the transmission line information.

(Supplementary Note 21)

The control device according to Supplementary Note 20, wherein the phase conjugation processing control means transmits an instruction to the optical repeater to implement the phase conjugation processing to calculate complex conjugation of the optical signal.

(Supplementary Note 22)

The control device according to Supplementary Note 21, wherein the chromatic dispersion compensation control means:

calculates a first accumulated chromatic dispersion amount at a first effective nonlinear distance with reference to the transmission-side network device in a first optical transmission line between a transmission-side network device that transmits an optical signal received by the optical repeater among the optical transmission lines to which the optical repeater is connected;

calculates a second accumulated chromatic dispersion amount in a second effective nonlinear distance with reference to the own device of the optical signal in the second optical transmission line between the reception-side network device of an optical signal transmitted by the optical repeater among the optical transmission lines to which the optical repeater is connected, the second accumulated chromatic dispersion amount having the opposite sign of the first accumulated chromatic dispersion amount; and calculates the chromatic dispersion compensation amount indicating the difference between the chromatic dispersion amount during transmission of the optical signal in the optical repeater when the accumulated chromatic dispersion amount of the optical signal becomes the second accumulated chromatic dispersion amount at the second effective nonlinear distance based on a statistical value of the transition of the accumulated chromatic dispersion amount of the optical signal according to the distance in the second optical transmission line, and the chromatic dispersion amount resulting from the complex conjugation.

(Supplementary Note 23)

An optical repeater indicating communicative connection of the own device with a control device comprising: a chromatic dispersion compensation control means that determines a chromatic dispersion compensation amount for compensation in the own device based on wavelength information of an optical signal transmitted and received by the own device, which is included in the optical network in the optical network path, and transmission line information of optical transmission lines connected to the own device; and a phase conjugation processing control means that determines phase conjugation processing in the own device based on the wavelength information and the transmission line information, the optical repeater comprising:

a phase conjugation processing means that performs phase conjugation processing on an electrical signal according to a received optical signal based on the phase conjugation processing information acquired from the control device; and a chromatic dispersion compensation means that performs chromatic dispersion compensation processing on an electrical signal according to a received optical signal based on the chromatic dispersion compensation amount.

(Supplementary Note 24)

The optical repeater according to Supplementary Note 23, wherein the phase conjugation processing means performs the phase conjugation processing based on an instruction to implement the phase conjugation processing to calculate complex conjugation of the optical signal.

(Supplementary Note 25)

The optical repeater according to Supplementary Note 24, provided with a chromatic dispersion compensation means that calculates a first accumulated chromatic dispersion amount at the first effective nonlinear distance with reference to the transmission-side network device in a first optical transmission line between a transmission-side network device that transmits an optical signal received by the optical repeater among the optical transmission lines to which the optical repeater is connected;

calculates a second accumulated chromatic dispersion amount in a second effective nonlinear distance with reference to the own device of the optical signal in a second optical transmission line between a reception-side network device of an optical signal transmitted by the optical repeater among the optical transmission lines to which the optical repeater is connected, the second accumulated chromatic dispersion amount having the opposite sign of the first accumulated chromatic dispersion amount;

communicatively connects with control that calculates the chromatic dispersion compensation amount indicating the difference between the chromatic dispersion amount during transmission of the optical signal in the optical repeater when the accumulated chromatic dispersion amount of the optical signal becomes the second accumulated chromatic dispersion amount at the second effective nonlinear distance based on a statistical value of the transition of the accumulated chromatic dispersion amount of the optical signal according to the distance in the second optical transmission line, and the chromatic dispersion amount resulting from the complex conjugation; and determines a chromatic dispersion amount of an optical signal transmitted to the reception-side network device based on the chromatic dispersion amount, which is the result of the complex conjugation after the phase conjugation processing, and the chromatic dispersion compensation amount acquired from the control device.

While preferred example embodiments of the disclosure have been described and illustrated above, it should be understood that these are exemplary of the disclosure and are not to be considered as limiting. Additions, omissions, substitutions, and other modifications can be made without departing from the scope of the present disclosure. Accordingly, the disclosure is not to be considered as being limited by the foregoing description, and is only limited by the scope of the appended claims.

What is claimed is:

1. An optical network system comprising an optical repeater included in an optical network and a control device that controls the optical repeater, wherein the control device comprises:

at least one first memory configured to store first instructions; and at least one first processor configured to execute the first instructions to:

manage wavelength information of optical signals transmitted and received by the optical repeater in a path of the optical network and transmission line information of optical transmission lines connected to the optical repeater;

determine a chromatic dispersion compensation amount for compensation in the optical repeater based on the wavelength information and the transmission line information; and determine phase conjugation processing in the optical repeater based on the wavelength information and the transmission line information, and the optical repeater comprises:

at least one second memory configured to store second instructions; and at least one second processor configured to execute the second instructions to:

acquire the determined chromatic dispersion compensation amount from the control device;

acquire the determined phase conjugation processing information from the control device;

perform phase conjugation processing on an electrical signal according to a received optical signal based on the acquired phase conjugation processing information; and perform chromatic dispersion compensation processing on an electrical signal according to a received optical signal based on the acquired chromatic dispersion compensation amount.

2. The optical network system according to claim 1, wherein the at least one first processor is configured to execute the first instructions to obtain an accumulated chromatic dispersion amount at the effective nonlinear distance in the reception-side optical transmission line of the optical repeater and an accumulated chromatic dispersion amount at the effective nonlinear distance in the transmission-side optical transmission line of the optical repeater, based on the reception-side wavelength information and transmission line information of the optical repeater and the transmission-side wavelength information and transmission line information of the optical repeater.

3. The optical network system according to claim 2, wherein the at least one first processor is configured to execute the first instructions to determine the chromatic dispersion compensation amount based on the accumulated chromatic dispersion amount at the effective nonlinear distance in the reception-side optical transmission line of the optical repeater, the accumulated chromatic dispersion amount at the effective nonlinear distance in the transmission-side optical transmission line of the optical repeater, and a chromatic dispersion compensation amount obtained by phase conjugation processing in the optical repeater.

4. The optical network system according to claim 2, wherein the at least one first processor is configured to execute the first instructions to determine the chromatic dispersion compensation amount based on an accumulated chromatic dispersion amount included in the transmission signal before optical transmission in the reception-side optical transmission line of the optical repeater, the accumulated chromatic dispersion amount at the effective nonlinear distance in the reception-side optical transmission line of the optical repeater, the accumulated chromatic dispersion amount at the effective nonlinear distance in the transmission-side optical transmission line of the optical repeater, and a chromatic dispersion compensation amount obtained by phase conjugation processing in the optical repeater.

5. The optical network system according to claim 1, wherein the chromatic dispersion compensation amount is a compensation amount obtained on the condition that the accumulated chromatic dispersion amount at the effective nonlinear distance in the reception-side optical transmission line of the optical repeater and the accumulated chromatic dispersion amount at the effective nonlinear distance in the transmission-side optical transmission line of the optical repeater have different signs.

6. The optical network system according to claim 1, wherein in an optical network comprising three or more odd-numbered paths connected via the optical repeater, the chromatic dispersion compensation control means and the phase conjugation processing control means determine the chromatic dispersion compensation amount and the phase conjugation processing in a target optical repeater based on the wavelength information and the transmission line information in the paths before and after the target optical repeater other than the optical repeater connected to the last path among the plurality of paths.

7. The optical network system according to claim 1, wherein the chromatic dispersion compensation control means and the phase conjugation processing control means obtain, in the optical repeater, a combination of a set of two paths in the front and rear stages and one optical repeater relaying the paths and one extra path, and determine the optical repeater other than the optical repeater connected to the extra path as the target optical repeater.

8. The optical network system according to claim 7, wherein the phase conjugation processing control means determines the phase conjugation processing in the optical repeater in the combination.

9. The optical network system according to claim 7, wherein the chromatic dispersion compensation control means determines the chromatic dispersion compensation amount in the optical repeater of the combination based on the wavelength information and transmission line information in the two optical transmission lines of the combination.

10. The optical network system according to claim 7, wherein the chromatic dispersion compensation control means determines the chromatic dispersion compensation amount in an optical repeater of the one extra path based on the wavelength information and transmission line information in the optical transmission line of the extra path.

11. The optical network system according to claim 7, wherein the chromatic dispersion compensation amount is the compensation amount calculated on the condition that the accumulated chromatic dispersion at the effective nonlinear distance in the optical transmission line of the one extra path becomes zero.

12. The optical network system according to claim 7, wherein in an optical network comprising four or more even-numbered paths connected via the optical repeater, the chromatic dispersion compensation control means and the phase conjugation processing control means determine the chromatic dispersion compensation amount and the phase conjugation processing in the optical repeater based on the wavelength information and the transmission line information in the paths before and after each optical repeater in a plurality of the paths.

13. The optical network system according to claim 7, wherein the chromatic dispersion compensation control means and the phase conjugation processing control means obtain a combination of two optical transmission lines and one optical repeater as a pair in the optical repeater.

14. The optical network system according to claim 7, wherein the phase conjugation processing control means determines the phase conjugation processing for the optical repeater in the combination.

15. The optical network system according to claim 7, wherein the chromatic dispersion compensation control means determines the chromatic dispersion compensation amount in the optical repeater of the combination based on the wavelength information and transmission line information in the two optical transmission lines of the combination.

16. A control method for controlling a control device comprising:

managing wavelength information of optical signals transmitted and received by an optical repeater in a path of an optical network, transmission line information of optical transmission lines connected to the optical repeater, and the number of paths of the optical network; and determining a chromatic dispersion compensation amount for compensation and phase conjugation processing in the optical repeater based on the wavelength information, the transmission line information, and the number of paths in the optical network.

17. The control method according to claim 16, determining the chromatic dispersion compensation amount and phase conjugation processing based on an accumulated chromatic dispersion amount at the effective nonlinear distance in the reception-side optical transmission line of each optical repeater in the optical network path and an accumulated chromatic dispersion amount at the effective nonlinear distance in the transmission-side optical transmission line of the optical repeater.

18. A control device comprising:

at least one memory configured to store first instructions; and at least one processor configured to execute the first instructions to:

determine a chromatic dispersion compensation amount for compensation in an optical repeater based on wavelength information of optical signals transmitted and received by the optical repeater in a path of an optical network, and transmission line information of optical transmission lines connected to the optical repeater, the optical repeater being included in the optical network; and determine phase conjugation processing in the optical repeater based on the wavelength information and the transmission line information.

19. The control device according to claim 18, wherein the at least one processor is configured to execute the first instructions to transmit an instruction to the optical repeater to implement the phase conjugation processing to calculate complex conjugation of the optical signal.

20. The optical repeater according to claim 19, wherein the at least one processor is configured to execute the first instructions to:

calculate a first accumulated chromatic dispersion amount at the first effective nonlinear distance with reference to the transmission-side network device in a first optical transmission line between a transmission-side network device that transmits an optical signal received by the optical repeater among the optical transmission lines to which the optical repeater is connected;

calculate a second accumulated chromatic dispersion amount in a second effective nonlinear distance with reference to the own device of the optical signal in a second optical transmission line between a reception-side network device of an optical signal transmitted by the optical repeater among the optical transmission lines to which the optical repeater is connected, the second accumulated chromatic dispersion amount having the opposite sign of the first accumulated chromatic dispersion amount; and calculates the chromatic dispersion compensation amount indicating the difference between the chromatic dispersion amount during transmission of the optical signal in the optical repeater when the accumulated chromatic dispersion amount of the optical signal becomes the second accumulated chromatic dispersion amount at the second effective nonlinear distance based on a statistical value of the transition of the accumulated chromatic dispersion amount of the optical signal according to the distance in the second optical transmission line, and the chromatic dispersion amount resulting from the complex conjugation.

* * * * *